United States Patent
Liu et al.

(10) Patent No.: US 10,951,588 B2
(45) Date of Patent: Mar. 16, 2021

(54) OBJECT PROPERTY GETTER AND SETTER FOR CLIENTLESS VPN

(71) Applicant: Palo Alto Networks, Inc., Santa Clara, CA (US)

(72) Inventors: Jiangxia Liu, Cupertino, CA (US); Qi Zhang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/046,892

(22) Filed: Jul. 26, 2018

(65) Prior Publication Data
US 2020/0036685 A1 Jan. 30, 2020

(51) Int. Cl.
*H04L 29/06* (2006.01)
*H04L 29/12* (2006.01)
*G06F 16/95* (2019.01)
*H04L 29/08* (2006.01)

(52) U.S. Cl.
CPC .......... *H04L 63/0272* (2013.01); *G06F 16/95* (2019.01); *H04L 61/1511* (2013.01); *H04L 67/42* (2013.01); *H04L 67/02* (2013.01)

(58) Field of Classification Search
CPC . H04L 63/0272; H04L 61/1511; H04L 67/42; H04L 61/02; G06F 16/95
USPC ......................................................... 709/203
See application file for complete search history.

(56) References Cited

U.S. PATENT DOCUMENTS

| | | | |
|---|---|---|---|
| 6,834,297 B1 * | 12/2004 | Peiffer | G06F 16/957 709/219 |
| 7,249,196 B1 * | 7/2007 | Peiffer | H04L 67/06 709/246 |
| 7,725,737 B2 | 5/2010 | Konanka | |
| 8,239,939 B2 | 8/2012 | Dunagan | |
| 8,667,146 B2 | 3/2014 | Agarwal | |
| 8,769,660 B2 | 7/2014 | Agarwal | |
| 8,799,515 B1 | 8/2014 | Wu | |
| 9,075,777 B1 * | 7/2015 | Pope | G06F 40/134 |
| 9,602,543 B2 | 3/2017 | Hidayat | |
| 9,836,314 B2 * | 12/2017 | Rubel | G06F 9/452 |
| 10,356,071 B2 | 7/2019 | Whiteside | |
| 2004/0044894 A1 * | 3/2004 | Lofgren | G06T 1/0028 713/176 |
| 2005/0076126 A1 | 4/2005 | Knight | |
| 2006/0248107 A1 * | 11/2006 | Coronado | G06F 8/60 |
| 2008/0250103 A1 * | 10/2008 | Bar-Yaacov | H04L 29/08846 709/203 |

(Continued)

FOREIGN PATENT DOCUMENTS

EP 3413192 A1 * 12/2018 ............. H04L 67/02

OTHER PUBLICATIONS

Author Unknown, OWASP, Clickjacking Defense Cheat Sheet, Mar. 24, 2016.

(Continued)

*Primary Examiner* — Tauqir Hussain
(74) *Attorney, Agent, or Firm* — Van Pelt, Yi & James LLP

(57) ABSTRACT

A modified accessor function call is provided to the client device by a clientless VPN in conjunction with a browsing session performed by the client device via the clientless VPN. A native accessor function call is received at a client device. The modified accessor function call is executed at the client device, including by using the native accessor function call.

18 Claims, 24 Drawing Sheets

(56) References Cited

U.S. PATENT DOCUMENTS

| | | | |
|---|---|---|---|
| 2009/0089874 A1 | 4/2009 | Mohanty | |
| 2009/0193126 A1 | 7/2009 | Agarwal | |
| 2009/0193129 A1 | 7/2009 | Agarwal | |
| 2009/0193498 A1 | 7/2009 | Agarwal | |
| 2009/0193513 A1 | 7/2009 | Agarwal | |
| 2011/0124319 A1 | 5/2011 | Fu | |
| 2011/0154130 A1 | 6/2011 | Helander | |
| 2012/0036178 A1 | 2/2012 | Gavini | |
| 2012/0159308 A1* | 6/2012 | Tseng | G06F 40/14 715/234 |
| 2013/0297596 A1 | 11/2013 | Mouline | |
| 2013/0311863 A1 | 11/2013 | Gutkin | |
| 2014/0365862 A1* | 12/2014 | Qu | G06F 9/548 715/234 |
| 2015/0009364 A1* | 1/2015 | Anderson | G06F 16/51 348/231.3 |
| 2015/0135302 A1 | 5/2015 | Cohen | |
| 2015/0347612 A1 | 12/2015 | Matsumoto | |
| 2016/0070579 A1* | 3/2016 | Furtwangler | G06F 8/315 717/116 |
| 2017/0093835 A1 | 3/2017 | Whiteside | |
| 2017/0126664 A1 | 5/2017 | Khandelwal | |
| 2017/0169124 A1* | 6/2017 | Reshadi | G06F 21/64 |
| 2017/0331789 A1* | 11/2017 | Kumar | H04L 63/0272 |
| 2018/0295134 A1 | 10/2018 | Gupta | |
| 2018/0359330 A1* | 12/2018 | Martin | H04L 67/2819 |

OTHER PUBLICATIONS

Author Unknown, Wikipedia, Cross-Origin, Resource Sharing, Jun. 21, 2016.

Author Unknown, Wikipedia, Same-Origin, Jun. 17, 2016.

* cited by examiner

Client/browser (204)    Firewall/Gateway (202)    Application (206)

(1) User logs into firewall. https://vpn.myfirewall.com/

(2) After successful authentication, user redirected to application URL https://www.myapp.com/start.html rewritten as
Location:
https://vpn.myfirewall.com/https_www.myapp.com/start.html
Set-cookie: VPN_SESSION_COOKIE=session_id (3) Browser sends HTTP request
GET /https_www.myapp.com/start.html
Host: www.myfirewall.com
Cookie: VPN_SESSION_COOKIE=session_id Firewall rewrites URL/HOST and sends request to application
GET /start.html
Host: www.myapp.com Application response
HTTP 1.1 200 OK
Server: Apache
Set-Cookie: app_ck=XYZ; domain=myapp.com; path=/
<HTML>
<a href="https://www.salesforce.com/index.html">Salesforce</a>
<a href="https://www.box.com/default.html">box</a>
<a href="/sites/intranet">intranet</a>
</HTML>

(4) Application response to client with NO Set-Cookie with content rewritten on Firewall HTTP 1.1 200 OK
Server: Apache
Set-Cookie: app_ck=XYZ; domain=myapp.com; path=/
<HTML>
<a href="https://vpn.myfirewall.com/https_www.salesforce.com/index.html">Salesforce</a>
<a href="https://vpn.myfirewall.com/https_www.box.com/default.html">box</a>
</HTML>

(5) User click on intranet link and browser send the request with no cookies
GET /https_www.myapp.com/sites/intranet
Host: vpn.myfirewall.com
Cookie: VPN_SESSION_COOKIE=session_id Firewall rewrites the URL and also adds cookie header to send application
GET /sites/intranet
Host: www.myapp.com
Cookie: app_ck=XYZ

FIG. 2

```
<html>
    <head>
        <title>Online Poker Play</title>
        <link href="/css/main.css" rel="stylesheet">
        <script src="/js/main.js"></script>
        <script src="/js/jquery.js"></script>
    </head>
    <body>
        <h1>Welcome to the Online Poker Play</h1>
        <script>
            $(document).ready(function() {
                // check visitor's country
                var country = $("#country").val()
                if (country != "US") {
                    alert("Sorry, only US users can play");
                }
            });
        </script>
    </body>
</html>
```

902 — `<link href="/css/main.css" rel="stylesheet">`
904 — `<script src="/js/main.js"></script>`
906 — `<script src="/js/jquery.js"></script>`

806 — the `<script>` block

```
<html>
<head>
    <title>Online Poker Play</title>
    <link href="https://192.1.2.3/www.onlinepokerplay.com/css/main.css" rel="stylesheet">
    <script src="https://192.1.2.3/www.onlinepokerplay.com/js/main.js"></script>
    <script src="https://192.1.2.3/www.onlinepokerplay.com/js/jquery.js"></script>
</head>
<body>
    <h1>Welcome to the Online Poker Play</h1>
    <script>
        pan_eval(
            "$(document).ready(function() {
                // check visitor\'s country
                var country = $(\"#country\").val()
                if (country != \"US\") {
                    alert(\"Sorry, only US users can play\");
                }
            });"
        );
    </script>
</body>
</html>
```

FIG. 9B

```
<html>
    <head>
        <title>Online Poker Play</title>
        <link href="/css/main.css" rel="stylesheet">
        <script src="/js/main.js"></script>
        <script src="/js/jquery.js"></script>
    </head>
    <body>
        <h1>Welcome to the Online Poker Play</h1>
        <script>
972⎯ (function(){
            $(document).ready(function() {
                // check visitor's country
                var country = $("#country").val()
                if (country != "US") {
                    alert("Sorry, only US users can play");    ⎯974
                }
            });
        }).toString().slice(12, -2)
        </script>
    </body>
</html>
```

```
(function(){
(function(R,B){'use strict';function Da(a,b,c){if(!a)throw
Ma("areq",b||"?",c||"required");return a}function Ea(a,b){if(!a&&!b)return"";if(!a)return
b;if(!b)return a;X(a)&&(a=a.join(" "));X(b)&&(b=b.join(" "));return a+" "+b}function
Na(a){var b={};a&&(a.to||a.from)&&(b.to=a.to,b.from=a.from);return b}function Y(a,b,c){var
d="";a=X(a)?a:a&&G(a)&&a.length?a.split(/\s+/):[];s(a,function(a,l){a&&0<a.length&&(d+=0<l?"
":"",d+=c?b+a:a+b)});return d}function Oa(a){if(a instanceof F)switch(a.length){case 0:return
a;
case 1:if(1===a[0].nodeType)return a;break;default:return F(ta(a))}if(1===a.nodeType)return
F(a)}function ta(a){if(!a[0])return a;for(var b=0;b<a.length;b++){var
c=a[b];if(1===c.nodeType)return c}}function
Pa(a,b,c){s(b,function(b){a.addClass(b,c)})}function
Qa(a,b,c){s(b,function(b){a.removeClass(b,c)})}function Z(a){return
function(b,c){c.addClass&&(Pa(a,b,c.addClass),c.addClass=null);c.removeClass&&(Qa(a,b,c.remov
eClass),c.removeClass=null)}}function oa(a){a=a||{};if(!a.$$prepared){var b=a.domOperation||
P;a.domOperation=function(){a.$$domOperationFired=!0;b();b=P};a.$$prepared=!0}return
a}function ha(a,b){Fa(a,b);Ga(a,b)}function
Fa(a,b){b.from&&(a.css(b.from),b.from=null)}function
Ga(a,b){b.to&&(a.css(b.to),b.to=null)}function V(a,b,c){var
d=b.options||{};c=c.options||{};var e=(d.addClass||"")+"
"+(c.addClass||""),l=(d.removeClass||"")+"
"+(c.removeClass||"");a=Ra(a.attr("class"),e,l);c.preparationClasses&&(d.preparationClasses=$
(c.preparationClasses,d.preparationClasses),delete c.preparationClasses);
e=d.domOperation!==P?d.domOperation:null;ua(d,c);e&&(d.domOperation=e);d.addClass=a.addClass?
a.addClass:null;d.removeClass=a.removeClass?a.removeClass:null;b.addClass=d.addClass;b.remove
Class=d.removeClass;return d}function Ra(a,b,c){function d(a){G(a)&&(a=a.split(" "));var
b={};s(a,function(a){a.length&&(b[a]=!0)});return b}var
e={};a=d(a);b=d(b);s(b,function(a,b){e[b]=1});c=d(c);s(c,function(a,b){e[b]=1===e[b]?null:-
1});var l={addClass:"",removeClass:""};s(e,function(b,c){var d,e;1===b?(d="addClass",
e=!a[c]||a[c+"-remove"]):-1===b&&(d="removeClass",e=a[c]||a[c+"-
add"]);e&&(l[d].length&&(l[d]+=" "),l[d]+=c)});return l}function y(a){return a instanceof
F?a[0]:a}function Sa(a,b,c){var d="";b&&(d=Y(b,"ng-",!0));c.addClass&&(d=$(d,Y(c.addClass,"-
add")));c.removeClass&&(d=$(d,Y(c.removeClass,"-
remove")));d.length&&(c.preparationClasses=d,a.addClass(d))}function pa(a,b){var c=b?"-
"+b+"s":"";la(a,[ma,c]);return[ma,c]}function va(a,b){var
c=b?"paused":"",d=aa+"PlayState";la(a,[d,c]);return[d,c]}function la(a,
b){a.style[b[0]]=b[1]}function $(a,b){return a?a+" "+b:a:b}function Ha

...

(arAt(0).toUpperCase()+
b.substr(1),K=b);"enter"!==b&&"move"!==b&&(r=t(a,b,u,x,J));p=t(a,b,u,x,K)}if(r||p){var
k;return{$$willAnimate:!0,end:function(){k?k.end():(H=!0,C(),ha(a,u),k=new
c,k.complete(!0));return k},start:function(){function
b(c){H=!0;C();ha(a,u);k.complete(c)}if(k)return k;k=new c;var
d,e=[];r&&e.push(function(a){d=r(a)});e.length?e.push(function(a){C();a(!0)}):C();p&&e.push(f
unction(a){d=p(a)});k.setHost({end:function(){H||(d||P)(void 0),b(void
0)},cancel:function(){H||((d||P)(!0),b(!0))}});c.chain(e,
b);return
k}}}}}]}]).provider("$$animateJsDriver",["$$animationProvider",function(a){a.drivers.push("$$
animateJsDriver");this.$get=["$$animateJs","$$AnimateRunner",function(a,c){function
d(c){return a(c.element,c.event,c.classes,c.options)}return function(a){if(a.from&&a.to){var
b=d(a.from),n=d(a.to);if(b||n)return{start:function(){function a(){return
function(){s(d,function(a){a.end()})}}var
d=[];b&&d.push(b.start());n&&d.push(n.start());c.all(d,function(a){e.complete(a)});var e=new
c({end:a(),cancel:a()});
return e}}else return d(a)}}]}])})(window,window.angular);
//# sourceMappingURL=angular-animate.min.js.map }
).toString().slice(12, -2)
```

```
__pan_hook_access_obj_prop(window, 'localStorage', new(function () {
    var s = {
        __proto__ : Storage.prototype
    };
    Object.defineProperty(s, 'setItem', {
        writable: false,
        configurable: false,
        enumerable: false,
        value: function (key, value) {
            // save new value in PAN localstorage
            this[key] = value;
            // get current domain
            var cur_domain_storage = __pan_orig_localStorage[__pan_app_hostname_data];
            if (!cur_domain_storage) {
                // generate domain id
                var cur_id = generate_domain_id();
                cur_domain_storage = {
                    id: cur_id,
                    keys: [key]
                };
                // save into native local storage
                __pan_orig_localStorage[__pan_app_hostname_data] = JSON.stringify(cur_domain_storage);
            } else {
                var keys = cur_domain_storage.keys;
                // push key into array if key doesn't exist
                if (keys.indexOf(key) === -1) {
                    cur_domain_storage.keys.push(key);
                    __pan_orig_localStorage[__pan_app_hostname_data] = JSON.stringify(cur_domain_storage);
                }
            }
            var id = cur_domain_storage.id;
            // save value into native local storage
            __pan_orig_localStorage[id + '_' + key] = value;
            return undefined;
        }
    });
    Object.defineProperty(s, 'getItem', {
        writable: false,
        configurable: false,
        enumerable: false,
        value: function (key) {
            key = format_value(key);
            return this.hasOwnProperty(key) ? format_value(this[key]) : null;
        }
    });
```

1202
1204
  1216
  1218
  1220
1206

```
Object.defineProperty(s, 'removeItem', {
    writable: false,
    configurable: false,
    enumerable: false,
    value: function (key) {
        // remove from PAN localstorage
        delete this[key];
        // get domain meta
        var cur_domain_storage = __pan_orig_localStorage[__pan_app_hostname_data];
        if (!cur_domain_storage) return undefined;
        cur_domain_storage = JSON.parse(cur_domain_storage);
        // get domain id
        var id = cur_domain_storage.id;
        var keys = cur_domain_storage.keys;
        var idx = keys.indexOf(key);
        if (idx > -1) {
            // remove key
            keys.splice(idx, 1);
            if (keys.length > 0) {
                cur_domain_storage.keys = keys;
                __pan_orig_localStorage[__pan_app_hostname_data] = JSON.stringify(cur_domain_storage);
            } else {
                // remove whole domain as key.lenght is 0
                __pan_orig_localStorage.removeItem(__pan_app_hostname_data);
            }
        }
        return __pan_orig_localStorage.removeItem(id + '_' + key);
    }
});
Object.defineProperty(s, 'key', {
    writable: false,
    configurable: false,
    enumerable: false,
    value: function (idx) {
        var i = 0;
        for (var key in this) {
            if (i == idx) return format_value(key);
            i++;
        }
        return null;
    }
});
```

```
object.defineProperty(s, 'clear', {
    writable: false,
    configurable: false,
    enumerable: false,
    value: function () {
        // clear PAN localstorage
        for (var key in this) {
            delete this[key];
            delete __pan_localStorage_snapshot[key];
            deleted = true;
        }
        // clear native localstorage
        var cur_domain_storage = __pan_orig_localStorage[__pan_app_hostname_data];
        if (!cur_domain_storage) return undefined;
        cur_domain_storage = JSON.parse(cur_domain_storage);
        var id = cur_domain_storage.id;
        var keys = cur_domain_storage.keys;
        for (var i = 0; i < keys.length; i++) {
            __pan_orig_localStorage.removeItem(id + '_' + keys[i]);
        }
        // clear domain meta
        return __pan_orig_localStorage.removeItem(__pan_app_hostname_data);
    }
});
object.defineProperty(s, 'length', {
    configurable: false,
    enumerable: false,
    get: function () {
        var i = 0;
        for (var key in this) {
            i++;
        }
        return i;
    }
});
})();
```

1212

1214

1300

```
var a = window.top.document, b = "domain";    ⌐1304
if (whiteListDomain.indexOf(a[b]) == -1) {    ⌐1302
  alert("You cannot use this page as an iframe")
  window.location = "/";
  return false;
}
```

FIG. 13

```
pan_hook_obj_prop = function (class_obj, prop, descriptor) {
    // find the root obj of who owns the property via prototype chain,
    // which might equal to class_obj or might not
    ...
    // save the original setter and getter
    ...
    // Change the getter and setter function to functions which are defined in pass in variable descriptor.
    // After function return, the getter and setter function will be replaced.
    Object.defineProperty(root_obj, prop, descriptor);
} pan_hook_call_obj_method = function (class_obj, method, descriptor) {
    // find the root obj of who owns the method via prototype chain,
    // which might equal to class_obj or might not
    ...
    // save the original object method accessor function
    ...
    // Change the object method accessor function to function which is passed in variable, descriptor.
    root_obj[method] = descriptor;
}
```

FIG. 15

```
pan_hook_obj_prop(window.HTMLImageElement, "src", {
    get: function() {
        // this is the new getter call
        // first, we still need to get the original value from the native getter function we saved before
        var orig_value = _pan_safe_get_access(this, "src");
        // we do intercept here
        var new_value = do_some_changes(orig_value);
        // return the modified value
        return new_value;
    },
    set: function(new_value) {
        // this is new setter call
        // we do intercept here
        var modified_new_value = do_some_changes(new_value);
        // then we call the native setter function we saved before to set the modified value
        return _pan_safe_set_access(this, "src", modified_value);
    }
});
```

FIG. 16

```
pan_overwrite_prop = function (class_obj, prop, descriptor, org_desc) {
  // generate ref key to save the original prop
  //the code of saving the original native function will be omitted from here.
  ....
  //modify Object property's getter and setter
  Object.defineProperty(class_obj, prop, descriptor);

};

Object.defineProperty(class_obj, ref_key, {
    value: hobj
  });
  Object.defineProperty(class_obj, prop, descriptor);
};

pan_hook_obj_prop = function (class_obj, prop, descriptor) {
  var org_class_obj = class_obj;
  // get class obj
  var oname = _pan_get_obj_name(class_obj);
  class_obj = window[oname];

var org_desc = Object.getOwnPropertyDescriptor(class_obj.prototype, prop);
  if (org_desc) {
    // has own property, overwrite it
    pan_overwrite_prop(class_obj, prop, descriptor, org_desc);
  } else {
    // try to get from original
    var a = Object.getOwnPropertyDescriptor(org_class_obj, prop);
    if (a) {
      pan_overwrite_prop(org_class_obj, prop, descriptor, a);
    } else {
      org_desc = _get_org_desc_from_proto(class_obj, prop);
      if (org_desc) {
        return pan_overwrite_prop(class_obj, prop, descriptor, org_desc);
      } else {
        return pan_overwrite_prop(class_obj, prop, descriptor, {
          get: undefined,
          set: undefined
        });
      }
    }
  }
}
```

FIG. 17A

```
pan_hook_call_obj_method = function (class_obj, method, descriptor) {

// Get native property descriptor, getter and setter var org_call_obj = Object.getOwnPropertyDescriptor(class_obj, method);
  if (org_call_obj) {
    org_method = class_obj[method];
  } else {
    var _adesc_obj = _get_org_desc_from_proto(class_obj, method);
    if (_adesc_obj === false) {
      org_method = class_obj[method];
    } else {
      org_method = _adesc_obj.descriptor.value;
    }
  }

// prepare to save native property descriptor.
  var oname = _pan_get_obj_name(class_obj);
  var hobj = {
    "call": org_method,
    "from": oname
  };

var ref_key = "_pan_" + method + "_call";
  if (org_call_obj) {
    //save native property descriptor
    class_obj[ref_key] = hobj;
    if (!__pan_dup_method_prop(class_obj, method, descriptor)) return false;
    class_obj[method] = descriptor;
  } else {
    //save native property descriptor
    class_obj.prototype[ref_key] = hobj;
    if (!__pan_dup_method_prop(class_obj.prototype, method, descriptor)) return false;
    class_obj.prototype[method] = descriptor;
  }
}
```

FIG. 17B

OBJECT PROPERTY GETTER AND SETTER FOR CLIENTLESS VPN

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 2 is a protocol diagram of a traditional URL rewrite.

FIG. 9A illustrates an example of HTML that can be received by a data appliance for processing.

FIG. 9B illustrates an example of a page after processing by an embodiment of a data appliance.

FIG. 9C illustrates an alternate example of a page after processing by an embodiment of a data appliance.

FIG. 9D illustrates an example of an excerpt of JavaScript code to which a data appliance has applied a wrapper.

FIGS. 12A-12C depict examples of JavaScript code.

FIG. 13 illustrates an example of a snippet of JavaScript code.

FIG. 15 illustrates pseudocode excerpts of examples of replacement functions.

FIG. 16 illustrates an example of a way to hook the "src" attribute of an HTML image object.

FIG. 17A illustrates an example of a modified setter function.

FIG. 17B illustrates an example of a modified getter function.

DETAILED DESCRIPTION

Figure 1:
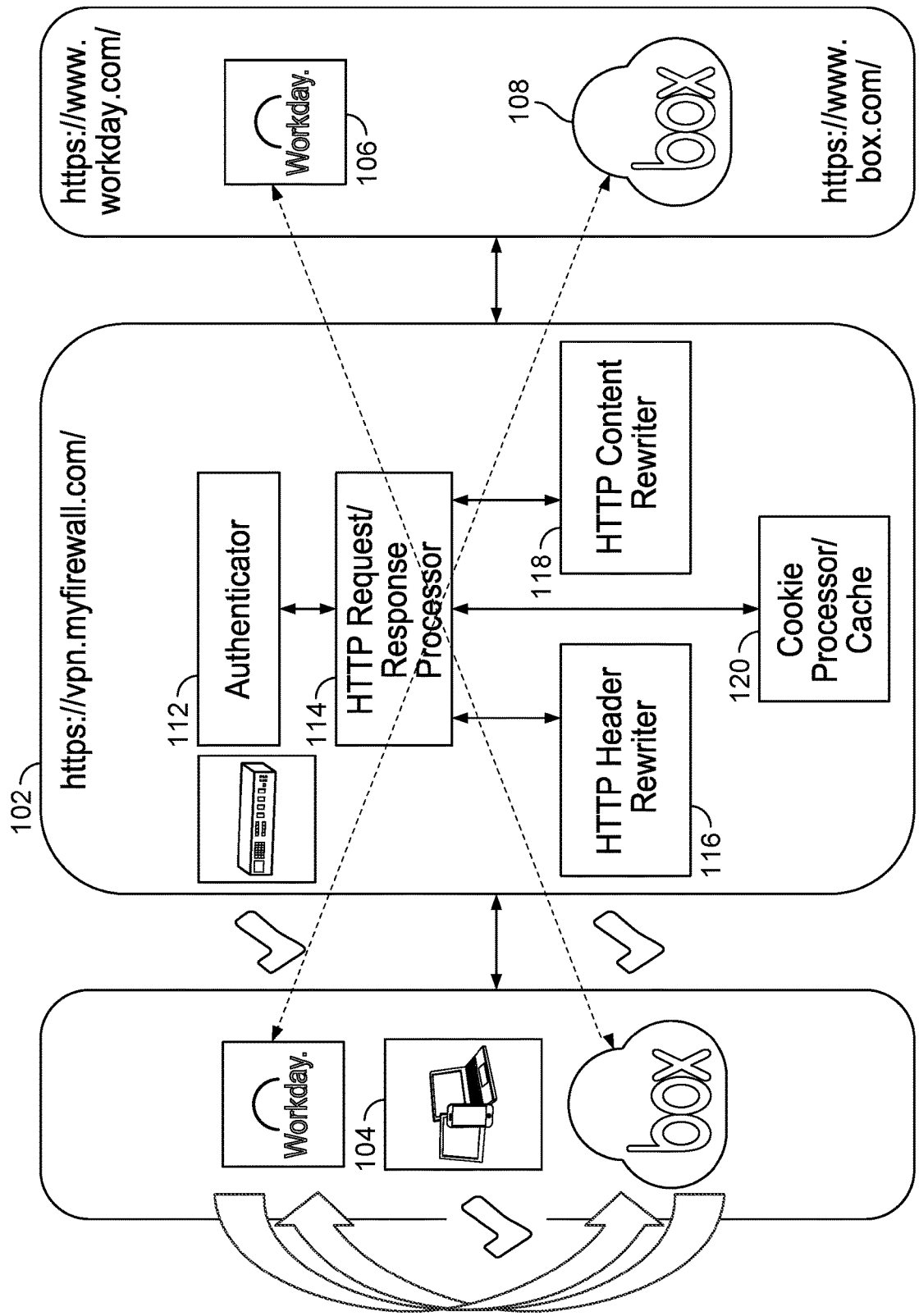
FIG. 1 is an example clientless VPN computing environment that illustrates a traditional clientless VPN approach.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Clientless Virtual Private Network (VPN) solutions exist, including clientless VPN software/devices (e.g., security/firewall devices/appliances that execute clientless VPN software on a processor). When a client (e.g., user device, such as a laptop, desktop computer, mobile device, or other type of computing device) uses a clientless VPN to visit an application such as a web site, existing/traditional VPN software/devices typically rewrite the Uniform Resource Identifier (URI) (e.g., Uniform Resource Locator (URL)) as the same domain but with a different URI path (e.g., rewriting https://www.example1-website.com/index.html to https://vpn.myfirewall.com/https_example1-website.com/index.html and rewriting https://example2-website.com/index.html to https://vpn.myfirewall.com/https_example2-website.com/index.html). However, the existing/traditional clientless VPN approach creates/exposes multiple security vulnerabilities (e.g., security flaws/holes). For example, due to the URI rewrite that results in the sharing of the common/same domain (e.g., the shared domain in the above example is vpn.myfirewall.com), an attacker (e.g., a hacker or other unauthorized user) could potentially execute code (e.g., run any JavaScript or other code) on any web site that is supported by the clientless VPN solution (e.g., example1-website.com and example2-website.com in the above example). Specifically, as a result of sharing a common/same domain, such an attack could bypass the security check(s) currently implemented in commercially available web browsers, as further discussed below. Thus, what is needed is an improved clientless VPN solution.

I. Overview of Techniques for an Advanced Clientless VPN

Various techniques for an advanced clientless VPN are disclosed. The disclosed techniques can facilitate efficient performance and enhanced security for clientless VPN solutions as will be further described below.

In some embodiments, a system, process, and/or computer program product for an advanced clientless VPN includes receiving a request for access to an application (e.g., an external web site) from a client device; translating the request for access to the application to generate a new domain (e.g., a new domain that is distinct); and providing the client device with access to the application using the new domain. For example, the clientless VPN can be executed/implemented on an appliance, gateway, server (e.g., including a virtual server), or other computing device (e.g., a clientless VPN gateway/firewall can be implemented on a security/firewall device or other networking device).

In one embodiment, the request includes a Uniform Resource Identifier (URI) associated with the application, and translating the request for access to the application to generate the new domain further includes hashing the Fully Qualified Domain Name (FQDN) of the application to generate a translation result. For example, the FQDN for a requested application can be hashed (e.g., using a Base64, MD5, or other hash function). The hash result can then be prepended to an existing FQDN part of the URI for accessing the clientless VPN, such as further described below. As also further described below, a local Domain Name System (DNS) server can be configured to map the new domain(s) generated by the clientless VPN to an IP address(es) associated with the system (e.g., clientless VPN gateway/firewall device(s)) (e.g., using a wildcard DNS mapping, such as *.vpn.myfirewall.com).

In various embodiments, the advanced clientless VPN provides additional functionality. Examples of such functionality are as follows. The advanced clientless VPN can process and forward a cookie received from the application to a browser executed on the client device. The advanced clientless VPN can authenticate a user associated with the request for access to the application from the client device. The advanced clientless VPN can process a HyperText Transfer Protocol (HTTP) request from a browser executed on the client device and send the HTTP request to the application. The advanced clientless VPN can process an HTTP response from the application and send the HTTP response to a browser executed on the client device. The advanced clientless VPN can also rewrite a header of a URI, and can rewrite content received from the application, wherein the application content includes a web site.

In various embodiments, a local DNS server is configured to wildcard each of the supported web sites (e.g., *.vpn.myfirewall.com) to facilitate the disclosed techniques for a secure clientless VPN framework. For example, each web site can be associated with a distinct domain that is generated using the disclosed techniques (e.g., AZU1.vpn.myfirewall.com and BSD2.vpn.myfirewall.com) but still have a common root domain (e.g., vpn.myfirewall.com), as further described below with respect to FIGS. 3A 3B and 4. The local DNS server on the enterprise network can be configured to associate an IP address(es) of the VPN/firewall device(s) for each of the supported web sites (e.g., multiple VPN/firewall devices can be deployed to facilitate efficient workload balancing), as also further described below with respect to FIGS. 3A 3B and 4.

For example, the disclosed techniques provide for a more secure solution for clientless VPNs. Specifically, the disclosed techniques overcome the security problems of existing clientless VPN solutions. More specifically, the disclosed techniques do not expose a security vulnerability (e.g., do not perform a rewrite that shares a common/same domain as described above with respect to existing/traditional clientless VPN approaches). As a result, an attack cannot bypass the security check(s) (e.g., same origin policy) currently implemented in commercially available web browsers, as further discussed below.

As another example, the disclosed techniques provide for a more efficient solution for clientless VPNs. Specifically, the disclosed techniques can utilize less storage for storing (e.g., caching) cookies at the clientless VPN server/device, which is a requirement of existing clientless VPN solutions. As further described below, the disclosed techniques can forward the cookies to the client devices (e.g., web browsers executed on the client devices for storing locally at the client devices) without having to store (e.g., locally cache) cookies at the clientless VPN server/device (e.g., improving data plane performance of a security device/appliance, because such server-side cookies do not have to be stored at the security device/appliance as such can be forwarded to the client devices), which reduces storage hardware requirements for clientless VPN devices and also reduces computational time for performing a look-up and fetching of such cookies as performed by existing clientless VPN solutions.

These and other aspects of the disclosed techniques for an advanced clientless VPN will be further described below.

II. Existing Approaches to Clientless VPN

FIG. 1 is an example clientless VPN computing environment that illustrates a traditional clientless VPN approach. Referring to FIG. 1, a clientless VPN 102 (e.g., implemented/executed on a security/firewall device/appliance) provides a traditional clientless VPN approach that supports an example web site 106 and example web site 108 to facilitate VPN access to those web sites for a client device 104 (e.g., client device 104 includes a commercially available web browser, but is not configured with a locally executed VPN client).

As also shown in FIG. 1, clientless VPN 102 includes components for implementing a clientless VPN solution. An Authenticator 112 is an authentication component. For example, a user can log into the clientless VPN solution via a web browser executed on client device 104 (e.g., access a login page by navigating the web browser to a URL for the firewall that provides the clientless VPN solution, such as https://vpn.myfirewall.com). The authenticator component can verify a user's entered credentials (e.g., login and password, biometric, and/or other credentials, including two/multi-factor authentication). The authenticated user can then submit a request to access a supported application/web site (e.g., a user can click an app/link that allows the user to access external apps/web sites, such as workday.com shown at 106, box.com shown at 108, or another supported web site (not shown in FIG. 1), such as facebook.com, mail.google.com, or another web site/service). An HTTP Request/Response Processor 114 processes the request utilizing one or more of the rewrite engine component(s)

shown as an HTTP Header Rewriter 116 and an HTTP Content Rewriter 118, and a cookie processing component shown as Cookie Processor/Cache 120, as further described below.

In this example, HTTP Header Rewriter 116 rewrites the Uniform Resource Identifier (URI) (e.g., Uniform Resource Locator (URL)) as the same domain but with a different URI path. For example, the HTTP header rewriter can rewrite a requested URI from client https://vpn.myfirewall.com/https_www.workday.com to https://www.workday.com (e.g., or similarly rewrite another requested URI for other supported web sites, such as https://vpn.myfirewall.com/https_www.box.com, https://vpn.myfirewall.com/https_www.facebook.com, and https://vpn.myfirewall.com/https_mail.google.com).

In this example, HTTP Content Rewriter 118 rewrites content of the returned web page(s), such as a returned web page for the supported web site (e.g., web sites 106, 108, or similarly for other supported web sites). For example, the content of the returned web page can similarly process URIs included in the web page (e.g., embedded in HTML of the web page), such as shown in the below example.

Example web page content for a supported web site (e.g., workday.com) is provided below (e.g., this is the version of the web page received from the workday.com web site that is to be processed by the clientless VPN prior to sending to the browser executed on the client device).

```
<html>
<script src="/js/help.js"></script>
<img src="http://www.example-web-site.com/logo.jpg">
<a href= "/login/login.php"> click to login </a>
...
</html>
```

Example web page content for the supported web site (e.g., workday.com) after processing by the HTTP content rewriter component is provided below (e.g., the processed web page can be sent from the clientless VPN to the browser executed on the client device).

```
<html>
<script src="/https_www.workday.eom/js/help.js"></script>
<img src="https://vpn.myfirewall.com/http_www.example-web-site.com/logo.jpg">
<a href= "/https_www.workday.com/login/login.php"> click to login </a>
...
</html>
```

However, as discussed above, this traditional clientless VPN approach exposes a security loophole in view of existing web browser security checks. Specifically, the above-described URI rewriting results in the sharing of a common/same domain (e.g., the shared domain in the above example is vpn.myfirewall.com). As a result, an attacker (e.g., a hacker or other unauthorized user) can execute code (e.g., run any JavaScript or other code) on any web site that is supported by the clientless VPN solution. More specifically, as a result of using the shared same domain, such an attack will bypass the security check(s) currently implemented in commercially available web browsers, as further discussed below.

Security protections implemented in current web browsers (e.g., Mozilla Firefox, Microsoft Internet Explorer®, and Google Chrome) include same-origin (e.g., domain) and cross-origin checks, as well as cookie and Ajax checks. Specifically, implementing a same-origin policy, a web browser typically only permits scripts to access data in a second web page if the web pages have the same origin (e.g., URI scheme, hostname, and port number). For example, commercially available web browsers generally implement the same-origin policy checks to prevent, for example, a malicious script on one web page from obtaining access to data on another web page or to perform other malicious or unwanted activities.

Cross-origin checks provide a more flexible mechanism that specifies how a browser and server can interact to determine whether or not to allow the cross-origin requests. For example, cross-origin resource sharing (CORS) can allow/trust certain cross-origin requests, such as for restricted resources, such as fonts, on a web page to be requested from another domain, but is more secure than allowing/trusting all cross-origin requests.

Another security protection implemented in current web browsers is to prevent other web pages from framing the web site to defend against clickjacking. For example, a browser can implement frame-breaking mechanisms to determine whether the browser should be allowed to render a page in a frame (e.g., <frame> or <iframe>) to avoid clickjacking attacks (e.g., to ensure that the web site's content is not embedded into other sites).

However, the above-described traditional URL rewrite approach results in the browser's requests being a shared/common domain (e.g., in the above-described example, https://vpn.myfirewall.com). As such, the above-described traditional URL rewrite approach renders it possible for a malware injected in one of the web sites supported by the clientless VPN, such as shown for authorized web site 108 (e.g., in the above-described example, www.box.com) to execute code (e.g., a script, such as JavaScript or other code/script) on another web site 106 (e.g., a different domain, such as www.workday.com as shown in FIG. 1), because the same-origin policy is not applied by the browser due to both the supported/authorized access to web site 106 and the other web site 108 are each accessed using the same firewall host (e.g., same domain, which is https://vpn.myfirewall.com in this example). As shown in FIG. 1, an authorized access to web site 106 would also allow access to another web site 108 or vice versa as a result of the appearance of such requests having the same origin to the web browser (e.g., same domain, which is https://vpn.myfirewall.com in this example).

FIG. 2 is a protocol diagram of a traditional URL rewrite. A traditional clientless VPN approach as similarly described above with respect to FIG. 1 is further described with respect to the protocol diagram as shown in FIG. 2.

Referring to FIG. 2, a client/browser 204 (e.g., a user computing device executing a web browser) is in communication (e.g., network/HTTP(S) communication) with a firewall/gateway 202 (e.g., a security device/appliance that executes a firewall and a clientless VPN solution). Firewall/gateway 202 is in communication (e.g., network/HTTP(S) communication) with an application 206 (e.g., a web site or other application).

As shown at a first stage (1), a user logs into the firewall (202) (e.g., https://vpn.myfirewall.com) as similarly described above with respect to FIG. 1.

At a second stage (2), after a successful authentication, the user is redirected to an application (e.g., https://www.myapp.com/start.html), and the firewall (202) returns the location for the application (e.g., https://vpn.myfirewall.com/https_www.myapp.com/start.html), and also sets VPN_SESSION_COOKIE which tracks the user session on vpn.myfirewall.com.

At a third stage (3), the browser (204) sends an HTTP request (e.g., GET /https_www.myapp.com/start.html Host: www.myfirewall.com). The firewall (202) rewrites the URL/HOST (e.g., using a rewrite engine, such as including an HTTP Header Rewriter 116 as similarly described above with respect to FIG. 1) and sends the request to the application (206) (e.g., GET/start.html Host: www.myapp.com). The application response is then provided that includes a cookie (e.g., Set-Cookie: app_ck=XYZ; domain=myapp.com; path=/) and HTML content of a web page (e.g., the supported application (206) in this example is for a salesforce.com web site, which is https://www.salesforce.com). As also shown in this example response from the application (206), the HTML content includes a link to another supported application, which is for a box.com web site (e.g., https://www.box.com). As similarly described above, the firewall (202) rewrites the HTML content (e.g., using a rewrite engine, such as including an HTTP Content Rewriter 118 as similarly described above with respect to FIG. 1) to rewrite the embedded URLs to append the embedded URLs (e.g., associated with supported web sites) after https://vpn.myfirewall.com. As also similarly described above, the firewall (202) processes the cookie (e.g., using Cookie Processor/Cache 120 as similarly described above with respect to FIG. 1) and stores/caches the cookie (e.g., the cookie is stored at the firewall (202)).

At a fourth stage (4), the application response (e.g., as rewritten as described above) is sent to the browser (204) with NO Set-Cookie with content rewritten on the firewall.

At a fifth stage (5), the user clicks on the intranet link and the browser (204) sends the request with no application cookies but with VPN portal cookie VPN_SESSION_COOKIE (e.g., sending a request as shown that includes GET /https_www.myapp.com/sites/intranet HOST: vpn.myfirewall.com Cookie: VPN_SESSION_COOKIE: session_id). As shown, the firewall (202) rewrites the URL and also adds a cookie header to send to the application (206) (e.g., GET/sites/intranet HOST: www.myapp.com Cookie: app_ck=XYZ).

However, the above-described traditional URL rewrite approach results in the browser's requests being a shared/common domain (e.g., in the above-described example, vpn.myfirewall.com), which exposes a security vulnerability in web browsers as discussed above.

Figure 3A:
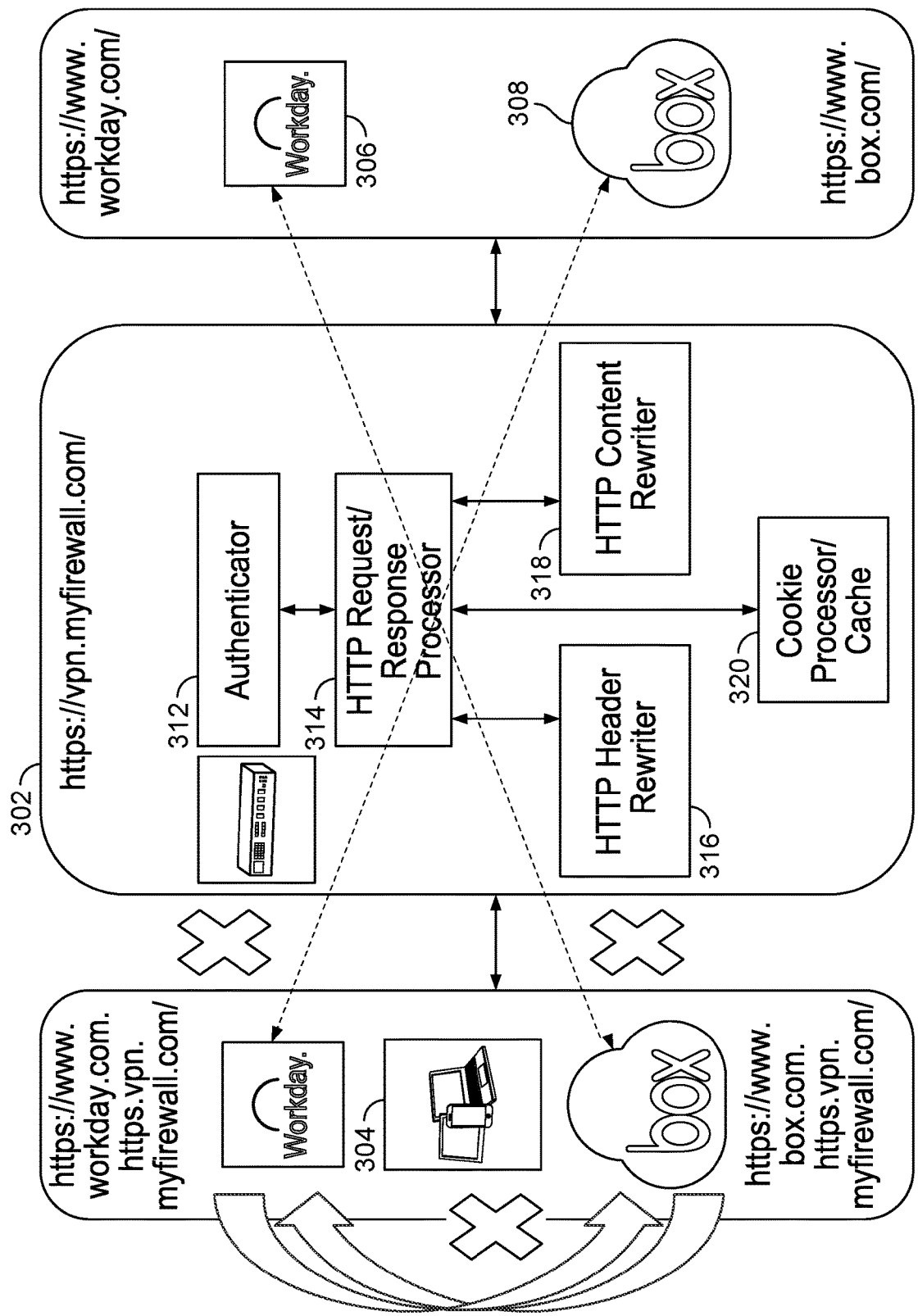
FIG. 3A is a clientless VPN computing environment that illustrates a secure domain rewriting technique in accordance with various embodiments.
Figure 3B:
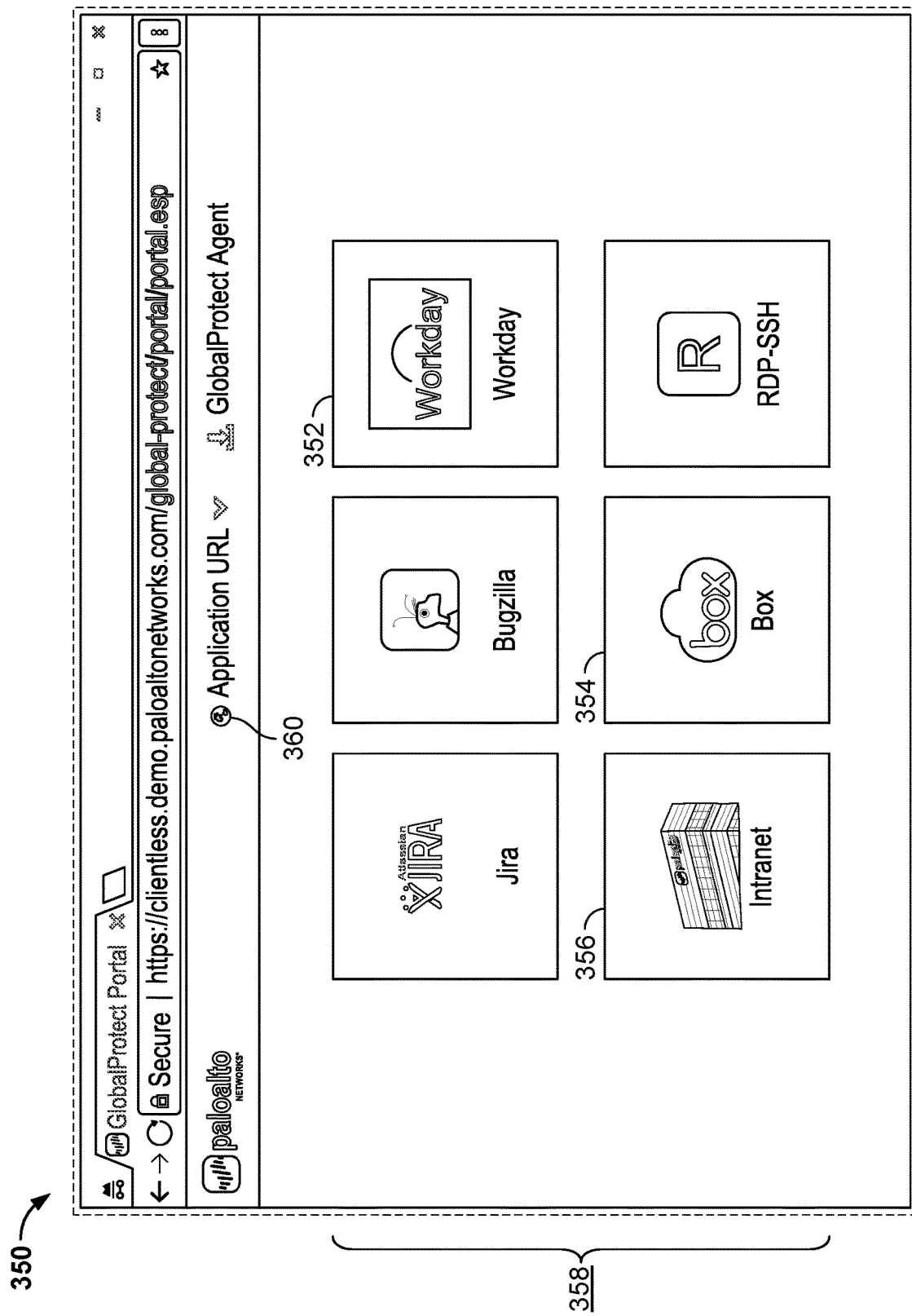
FIG. 3B illustrates an example of a portal as rendered in a client web browser.
Figure 4:
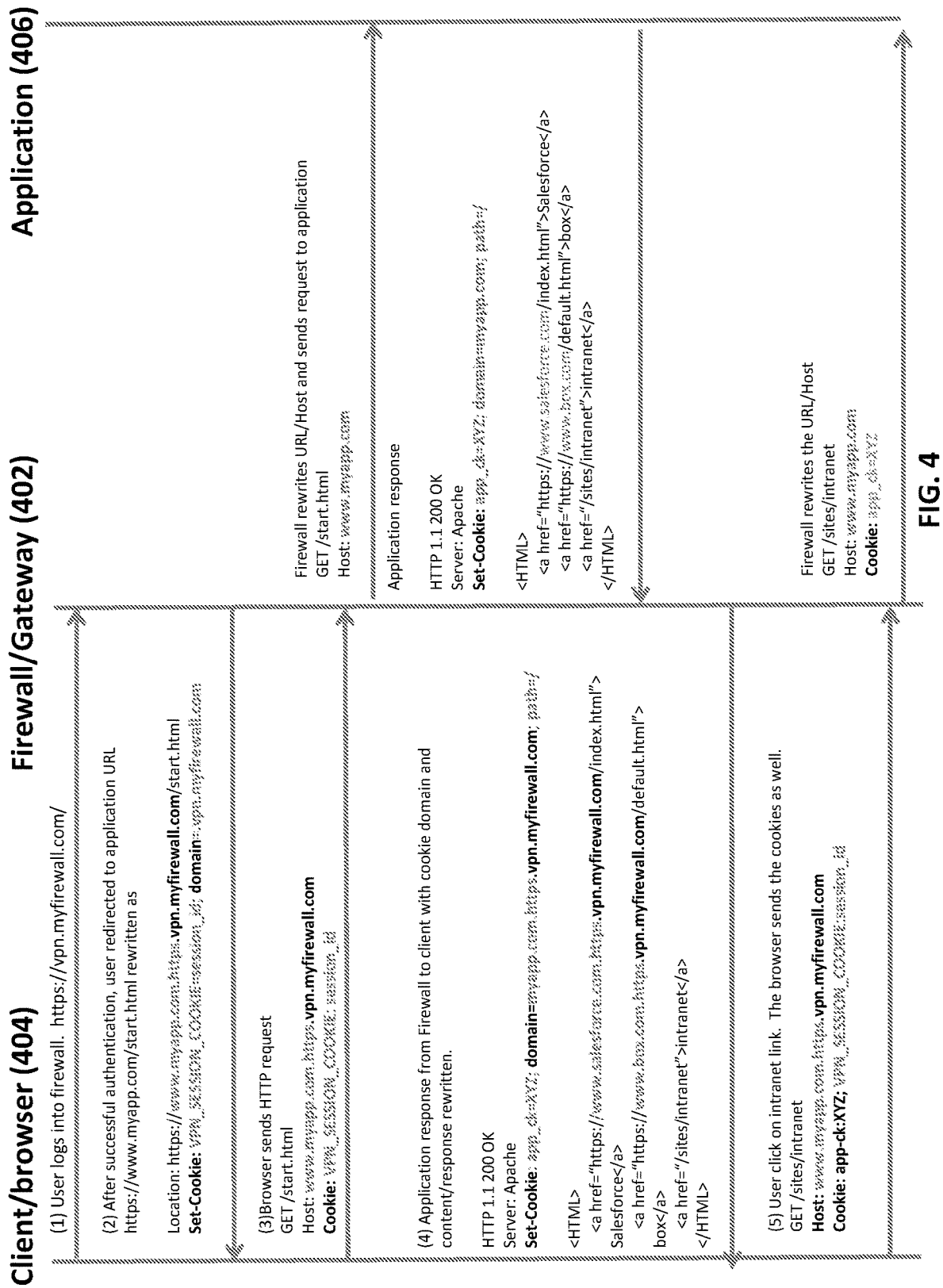
FIG. 4 is a protocol diagram for a secure domain rewrite in accordance with some embodiments.

Accordingly, new and improved techniques for an advanced clientless VPN are disclosed as will now be further described with respect to FIGS. 3A 3B and 4.

III. Techniques for an Advanced Clientless VPN

FIG. 3A is a clientless VPN computing environment that illustrates a secure domain rewriting technique in accordance with various embodiments. Referring to FIG. 3A, a clientless VPN of a data appliance 302 (e.g., implemented/executed on a security/firewall device/appliance/gateway) provides an advanced clientless VPN solution that supports an example web site 306 and example web site 308 to facilitate VPN access to those web sites for a client device 304 (e.g., client device 304 includes a commercially available web browser, but is not configured with a locally executed VPN client).

In one embodiment, secure clientless VPN 302 includes components for implementing an advanced clientless VPN solution as shown in FIG. 3A. As one example, authenticator 312 is a component that authenticates users. For example, a user can log into the advanced clientless VPN solution via a web browser executed on client device 304 (e.g., access a login page by navigating the web browser to a URI for the firewall that provides the clientless VPN solution, such as https://vpn.myfirewall.com). The authenticator component verifies a user's entered credentials (e.g., login and password, biometric, and/or other credentials, including two/multi-factor authentication). One authenticated, the user is presented, in various embodiments, with a portal, an example of which is illustrated in FIG. 3B. JavaScript is served (e.g., as "panportal.js") to the user in conjunction with rendering portal 350 in the user's browser (e.g., portal 350 incorporates JavaScript). As will be described in more detail below, the JavaScript is used to help support clientless VPN functionality, including by augmenting/superseding various native functionality of the end user's browser, and also to perform other actions, such as rewriting URIs (e.g., URIs not otherwise rewritten by appliance 302). In various embodiments, the JavaScript provided by portal 350 incorporates an open source or other JavaScript interpreter/parser (an example of which is Esprima, available at esprima.org), which can perform lexical analysis (tokenization) or syntactic analysis (parsing) of passed JavaScript. The interpreter/parser can be used to analyze JavaScript passed to it by data appliance 302 to extract URIs and rewrite them, as applicable.

The authenticated user can interact with portal 350 to submit requests to access supported applications/web sites. As one example, a user can click an app/link that allows the user to access external apps/web sites. Examples of such apps/links accessible via portal 350 include workday.com (352), box.com (354), and as applicable, other apps/links (e.g., to resources stored on a corporate intranet (356)). If the user wishes to visit sites for which apps/links are not provided in region 358 (e.g., www.facebook.com or www.gmail.com), the user can click on region 360 and type in a destination (e.g., www.wikipedia.org) in the resulting dropdown.

An HTTP Request/Response Processor 314 processes the request utilizing one or more of the rewrite engine component(s) shown as an HTTP Header Rewriter 316 and an HTTP Content Rewriter 318, and a cookie processing component shown as Cookie Processor/Cache 320, as further described below.

In one embodiment, HTTP Header Rewriter 316 rewrites the URI from the client to the original application. For example, the HTTP header rewriter can rewrite a requested URI https://www.workday.com/ to https://www.workday.com.https.vpn.myfirewall.com/ (e.g., or similarly rewrite another requested URI for other supported web sites, such as https://www.box.com/ to https://www.box.com.https.vpn.myfirewall.com/).

In one embodiment, HTTP Content Rewriter 318 rewrites content of the returned web page(s), such as a returned web page for the supported web site (e.g., web sites 306, 308, or similarly for other supported web sites). For example, the content of the returned web page can similarly process URIs included in the web page (e.g., embedded in HTML of the web page), such as shown in the below example.

Example web page content for a supported web site (e.g., workday.com) is provided below (e.g., this is the version of the web page received from the workday.com web site that is to be processed by the advanced clientless VPN prior to sending to the browser executed on the client device).

```
<html>
<script src="/js/help.js"></script>
<img src="http://www.example-web-site.com/logo.jpg">
<a href= "/login/login.php"> click to login </a>
...
</html>
```

Example web page content for the supported web site (e.g., workday.com) after processing by the HTTP content rewriter component is provided below (e.g., the processed web page can be sent from the advanced clientless VPN to the browser executed on the client device).

```
<html>
<script src: "/js/help.js/https_www.firewall.com"
<img src="https://www.example-web-site.com.https.vpn.myfirewall.com/logo.jpg">
<a href= "/login/login.php"> click to login </a>
...
</html>
```

Thus, the disclosed advanced clientless VPN rewrites URIs such that the domains (e.g., including for each of the supported web sites) are distinct unlike the traditional clientless VPN approach that rewrites URIs such that they share a common/same domain (e.g., the shared domain in the above example is vpn.myfirewall.com), which exposes a security loophole in view of existing web browser security checks (e.g., same-origin checks) as described above. As a result, unlike the traditional rewrite approach performed by existing clientless VPNs, an attacker (e.g., a hacker or other unauthorized user) cannot execute code (e.g., run any JavaScript or other code) on any web site that is supported by the advanced clientless VPN solution using the disclosed secure URI rewrite techniques. Specifically, as a result of rewriting URIs of supported applications (e.g., web sites) such that the domains are distinct, such an attack cannot bypass the security check(s) currently implemented in commercially available web browsers, such as same-origin (e.g., domain) and cross-origin checks, as well as cookie and Ajax checks as described above.

Referring to FIG. 3A, the above-described secure URI rewrite approach does not allow for a malware injected in one of the web sites supported by the clientless VPN as shown for authorized web site 308 (e.g., in the above-described example, www.box.com) to execute code (e.g., a script, such as JavaScript or other code/script) on another web site 306 (e.g., a different domain, such as www.workday.com as shown in FIG. 3A), because the same-origin policy is applied by the browser due to the supported/authorized access to web site 306 having the workday.com domain that is different than the other web site 308 having the box.com domain in this example even after the URI rewrite is performed by the advanced clientless VPN. As shown in FIG. 3A, an authorized access to web site 306 would not allow access to another web site 308 or vice versa as a result of the requests having distinct domains. For example, the web browser can properly apply a domain script, whether to allow a script from a different domain to execute or not based on a domain security/validation check (e.g., grant or block for JavaScript to execute based on domain match or not).

In one embodiment, Cookie Processor/Cache 320 can forward cookies received from the supported web sites to the client device as further described below with respect to FIG. 4. For example, unlike the above-described traditional clientless VPN approach, because the disclosed techniques for a secure clientless VPN rewrite the URIs to utilize distinct domains, the cookies do not have to be stored at the firewall device and associated in a cookie/session table with each respective session. As a result, this technique improves computational efficiency to reduce compute time as such lookups in a cookie/session table need not be performed by the firewall/gateway (302) and storage requirements as such cookies need not be stored for active sessions at the firewall/gateway (302) (e.g., which can be costly from a storage requirement perspective on a firewall device, such as if there are thousands or more active sessions with cookies given the potential sizes of the cookies).

A. Translating the Requested Domains and DNS Wildcard Techniques

In one embodiment, the disclosed techniques for an advanced clientless VPN include hashing the requested FQDN part of a URI for a supported application (e.g., web site 306 or 308) to generate a hash result (e.g., a unique value). For example, the requested URI can be converted/translated using a hash function (e.g., translated using Base64, MD5, or another hash function), and the converted/translated value can then be prepended to the URI for the firewall/gateway (302) as will now be described. In this example, assuming that www.workday.com is converted/translated (e.g., hashed) to a value of AZU1, then the requested URI can be rewritten as AZU1.vpn.myfirewall.com. Similarly, assuming that www.dropbox.com is converted/translated (e.g., hashed) to a value of BSD2, then the requested URI can be rewritten as BSD2.vpn.myfirewall.com. The hash can be used to uniquely identify the URI for the supported application. Also, the hash can effectively shorten rewritten FQDN names (e.g., which can avoid generating rewritten FQDN parts of URIs that are too long, as commercially available web browsers can specify maximum lengths of FQDNs and exceeding that maximum length can result in an error).

In one embodiment, a DNS server (e.g., a local DNS server(s) for an enterprise network for the client device (304) is configured with wildcard versions for the advanced clientless VPN device (e.g., *.vpn.myfirewall.com in this example). For example, the local DNS server can be configured to map *.vpn.myfirewall.com to IP addresses for a set of firewall devices (e.g., 192.168.10.5, 192.168.10.6, and 192.168.10.7 for the three firewall devices) to provide for workload balancing across the set of firewall devices for the enterprise network.

Accordingly, the disclosed techniques facilitate workload balancing across the set of firewall devices for a more efficient and secure clientless VPN solution for the enterprise network computing environment. Moreover, the disclosed techniques are more secure than existing clientless VPN techniques, as similarly discussed above (e.g., malware injected in a supported web site, such as 308, that attempts to execute code from another web site, such as 306 or vice versa, would be prevented from executing that code with the disclosed secure domain rewriting, because the same origin policy in the browser would not allow for such across distinct domains).

FIG. 4 is a protocol diagram for a secure domain rewrite in accordance with some embodiments. The disclosed techniques for an advanced clientless VPN as similarly described above with respect to FIG. 3A are further described with respect to the protocol diagram as shown in FIG. 4.

Referring to FIG. 4, a client/browser 404 (e.g., a user computing device executing a web browser) is in communication (e.g., network/HTTP(S) communication) with a firewall/gateway 402 (e.g., a security device/appliance that executes a firewall and an advanced clientless VPN solution or a firewall that includes an advanced clientless VPN). Firewall/gateway 402 is in communication (e.g., network/HTTP(S) communication) with an application 406 (e.g., a web site or other application).

As shown at a first stage (1), a user logs into the firewall (402) (e.g., https://vpn.myfirewall.com) as similarly described above with respect to FIG. 3A.

At a second stage (2), after a successful authentication, the user is redirected to an application (e.g., https://www.myapp.com/start.html), and the firewall (402) returns the location for the application (e.g., https://www.myapp.com.https.vpn.myfirewall.com/start.html); and also sets VPN_SESSION_COOKIE to .vpn.myfirewall.com domain which tracks the user session on vpn.myfirewall.com.

At a third stage (3), the browser (404) sends an HTTP request (e.g., GET /start.html Host: www.myapp.com.https.vpn.myfirewall.com). The firewall (402) rewrites the URL/HOST (e.g., using a rewrite engine, such as including an HTTP Header Rewriter 316 as similarly described above with respect to FIG. 3A) and sends the request to the application (406) (e.g., GET/start.html Host: www.myapp.com). The application response is then provided that includes a cookie (e.g., Set-Cookie: app_ck=XYZ; domain=myapp.com; path=/) and HTML content of a web page (e.g., the application (406) in this example is for a salesforce.com web site, https://www.salesforce.com). As also shown in this example response from the application (406), the HTML content includes a link to another supported application, which is for a box.com web site (e.g., https://www.box.com). As similarly described above, the firewall (402) rewrites the HTML content (e.g., using a rewrite engine, such as including an HTTP Content Rewriter 318 as similarly described above with respect to FIG. 3A) to rewrite the embedded URLs to prepend the embedded URLs as similarly described above with respect to FIG. 3A (e.g., in some cases, if the web page included a link to www.cnn.com and if www.cnn.com is not a supported web site for the clientless VPN, then that link for cnn.com would be rewritten by the HTTP Content Rewriter; however, the security policies configured on the firewall would prevent the client/user from further accessing www.cnn.com). As also similarly described above, the firewall (402) processes the cookie (e.g., using Cookie Processor/Cache 320 as similarly described above with respect to FIG. 3A, and the cookie can be processed as also further described below) to forward the cookie to the browser (404) (e.g., and the client/browser (404) can then locally store the cookie on the client device).

At a fourth stage (4), the application response (e.g., as rewritten by the firewall (402) as described above) is sent to the browser (404) with a Set-Cookie and with content rewritten on the firewall (e.g., rewritten using the advanced clientless VPN components as described above). As shown, the domain of the Set-Cookie was rewritten on the firewall (402) (e.g., Set-Cookie: app_ck=XYZ; domain=myapp.com.https.vpn.myfirewall.com; path=/). As also shown, the embedded URLs (e.g., associated with supported web sites) of the HTML content were rewritten on the firewall (402) (e.g., rewriting the embedded URLs of https://www.salesforce.com/index.html to https://www.salesforce.com.https.vpn.myfirewall.com/index.html and https://www.box.com/default.html to https://www.box.com.https.vpn.myfirewall.com/default.html).

At a fifth stage (5), the user clicks on the intranet link and the browser (404) sends the request with the cookie(s) (e.g., sending a request as shown that includes GET/sites/intranet HOST: www.myapp.com.https.vpn.myfirewall.com and Cookie: app-ck=XYZ). As shown, the firewall (402) rewrites the URL/Host to send to the application (406) (e.g., GET/sites/intranet HOST: www.myapp.com Cookie: app_ck=XYZ).

Figure 5:
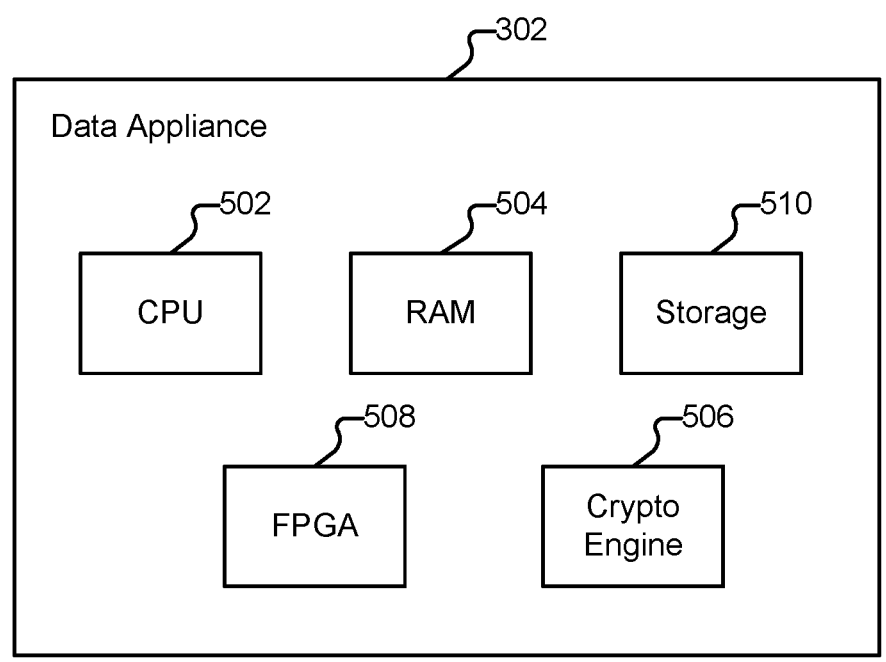
FIG. 5 illustrates a data appliance in accordance with some embodiments.
Figure 6:
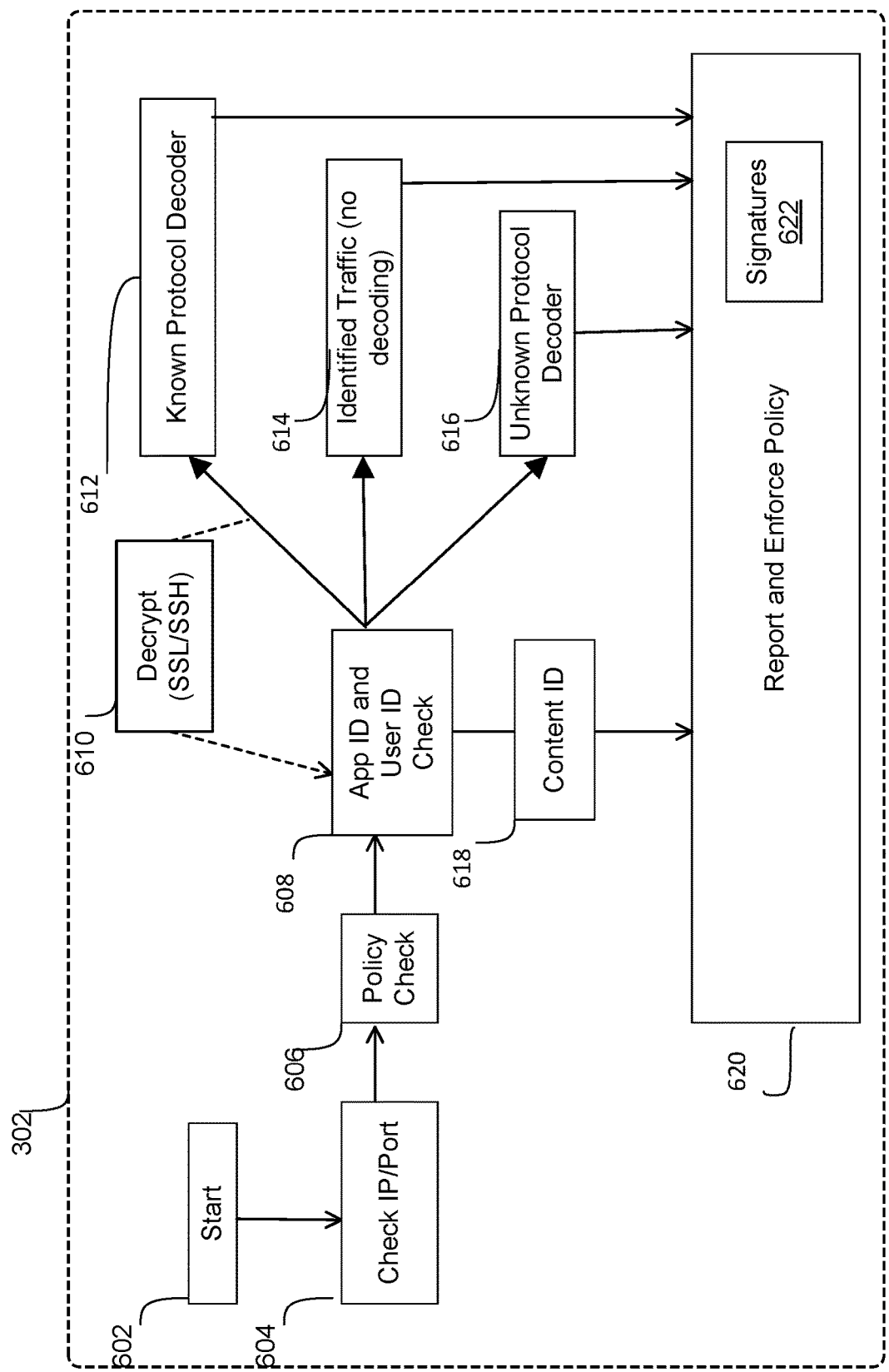
FIG. 6 is a functional diagram of an architecture of a data appliance in accordance with some embodiments.

Accordingly, new and improved techniques for an advanced clientless VPN are disclosed and can be implemented using a data appliance that includes a firewall as will now be further described with respect to FIGS. 5 and 6.

B. Example Components of a Data Appliance

FIG. 5 illustrates a data appliance in accordance with some embodiments. The example shown is a representation of physical components that are included in data appliance 302 (e.g., a firewall/security device/gateway/appliance or other computing device that can execute a firewall and a clientless VPN or a firewall that includes an implementation of an advanced clientless VPN as described herein), in various embodiments. Specifically, data appliance 302 (e.g., a device that performs various security related functions, such as a security device, which can be in the form of, for example, a security appliance, security gateway, security server, and/or another form of a security device) includes a high performance multi-core CPU 502 and RAM 504. Data appliance 302 also includes a storage 510 (such as one or more hard disks), which is used to store policy and other configuration information, as well as other information, such as URL categorization information and/or malware signatures. Data appliance 302 can also include one or more optional hardware accelerators. For example, data appliance 302 can include a cryptographic component 506 configured to perform encryption and decryption operations, and one or more FPGAs 508 configured to perform matching (e.g., pattern matching, such as for application identification (App ID) as further described below with respect to FIG. 6), act as network processors, and/or perform other tasks.

Data appliance 302 can take a variety of forms. For example, data appliance 302 can be implemented as a single device, or as multiple devices working in cooperation. Whenever data appliance 302 is described as performing a task, a single component, a subset of components, or all components of data appliance 302 may cooperate to perform the task. Similarly, whenever a component of data appliance 302 is described as performing a task, a subcomponent may perform the task and/or the component may perform the task in conjunction with other components. In various embodiments, portions of data appliance 302 are provided by one or more third parties. Depending on factors such as the amount of computing resources available to data appliance 302, various logical components and/or features of data appliance 302 may be omitted and the techniques described herein adapted accordingly. Similarly, additional logical components/features can be included in embodiments of data appliance 302 as applicable.

FIG. 6 is a functional diagram of an architecture of a data appliance in accordance with some embodiments. As shown in FIG. 6, network traffic is monitored at data appliance 302 (e.g., a firewall/security device/gateway/appliance or other computing device that can execute a firewall and an advanced clientless VPN or a firewall that includes an advanced clientless VPN). In one embodiment, network traffic is monitored using a data appliance (e.g., a data appliance that includes security functions, such as a security device/appliance that includes a firewall or a virtual firewall). In one embodiment, network traffic is monitored using a gateway (e.g., a gateway that includes security functions, such as a security gateway/network gateway firewall). In one embodiment, the network traffic is monitored using pass through (e.g., in-line) monitoring techniques. In various embodiments, network traffic is monitored using a state-based firewall. The state-based firewall can monitor traffic flows using an application (app) identifier (ID) component (e.g., APP-ID (App ID) engine, shown as App ID Check & User ID Check 608 in FIG. 6). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 6, network traffic monitoring begins at 602. An IP address and port component 604 determines an IP address and port number for a monitored traffic flow (e.g., a session) based on packet analysis. A policy check component 606 determines whether any policies can be applied based on the IP address and port number. As also shown in FIG. 6, an App ID Check & User ID Check 608 identifies an application and a user. For example, the application can be identified using an App ID component (608) using various application signatures for identifying applications based on packet flow analysis (e.g., implemented using an FPGA, such as FPGA 508 as shown in FIG. 5). The user identification can also be determined based on a source IP address (e.g., based on one or more IP addresses). In this example, the App ID component (608) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as shown at 612, 614, and 616, to process the classified traffic for each monitored session's traffic flow.

As also shown in FIG. 6, if the monitored traffic is encrypted (e.g., encrypted using HTTPS, SSL, SSH, or another known encryption protocol), then the monitored traffic can be decrypted using a decrypt component 610 (e.g., applying trusted man-in-the-middle techniques using a self-signed certificate associated with the network device, such as a data appliance, gateway, or other network device implementing the firewall). A known protocol decoder component 612 decodes and analyzes traffic flows using known protocols (e.g., applying various signatures (622) for the known protocol) and reports the monitored traffic analysis to a report and enforce policy component 620. Identified traffic (no decoding required) component 614 reports the identified traffic to the report and enforce policy component 620. An unknown protocol decoder component 616 decodes and analyzes traffic flows (e.g., applying various heuristics) and reports the monitored traffic analysis to the report and enforce policy component 620.

In various embodiments, the results of the various traffic monitoring techniques using known protocol decoder component 612, identified traffic component 614, and unknown protocol decoder component 616 described above are provided to report and enforce policies component 620 (e.g., network/routing policies, security policies, and/or firewall policies). For example, firewall policies can be applied to the monitored network traffic using application identification, user identification, and/or other information to match signatures 622 (e.g., application/APP ID signatures, such as URL signatures, file-based, protocol-based, and/or other types/forms of signatures for detecting malware or suspicious behavior).

As also shown, appliance 302 also includes a content-ID component 618. In one embodiment, the content-ID component's identified content is also used by report and enforce policy component 620, possibly in various combinations with other information, such as application, user, and/or other information, to enforce various security/firewall policies/rules.

Additional example processes for the disclosed techniques for an advanced clientless VPN will now be described.

C. Example Processes for an Advanced Clientless VPN

Figure 7:
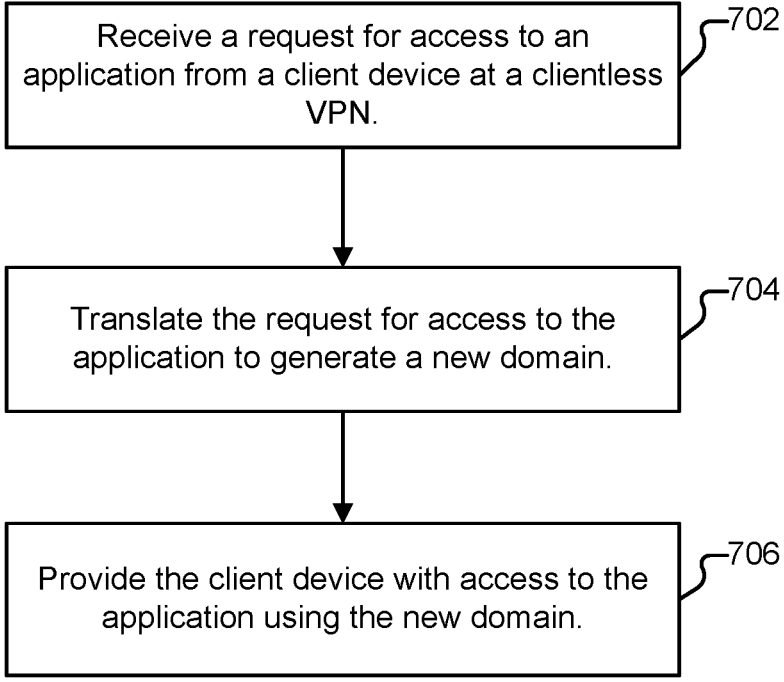
FIG. 7 is a flow diagram of a process for an advanced clientless VPN in accordance with various embodiments.

FIG. 7 is a flow diagram of a process for an advanced clientless VPN in accordance with various embodiments. In some embodiments, a process 700 as shown in FIG. 7 is performed by the platform and techniques as similarly described above including the embodiments described above with respect to FIGS. 3A 3B and 4 (e.g., is performed by an advanced clientless VPN as described above with respect to FIGS. 3A 3B and 4).

The process begins at 702 when a request for access to an application from a client device is received at a clientless VPN. For example, a user can use the clientless VPN to initiate access to the application (e.g., an external web site) as similarly described above with respect to FIGS. 3A 3B and 4. The clientless VPN can be executed/implemented on an appliance, gateway, server (e.g., including a virtual server), or other computing device (e.g., a clientless VPN gateway/firewall that can be implemented on a security/firewall device or other networking device) as also described above.

At 704, the request for access to the application is translated to generate a new domain. For example, the clientless VPN can translate a URI associated with the request to generate a new domain. As similarly described above, the clientless VPN can translate the URI request for the access to the application to generate a new domain by hashing the URI to generate a translation result (e.g., using a Base64, MD5, or other hash function to generate a hash result), in which at least a portion of the new domain includes the translation result. In an example implementation, the hash result can then be prepended to an existing URI for accessing the clientless VPN, such as similarly described above with respect to FIGS. 3A 3B and 4. As also described above, a local DNS can be configured to map the new domain(s) generated by the clientless VPN to an IP address(es) associated with the system (e.g., using a wildcard DNS mapping, such as *.vpn.myfirewall.com, that can be mapped to an IP address(es) associated with clientless VPN gateway/firewall device(s)).

At 706, the client device is provided with access to the application using the new domain. For example, the clientless VPN can provide the client device with access to the application (e.g., external web site) using the new domain as similarly described above with respect to FIGS. 3A 3B and 4.

Figure 8:
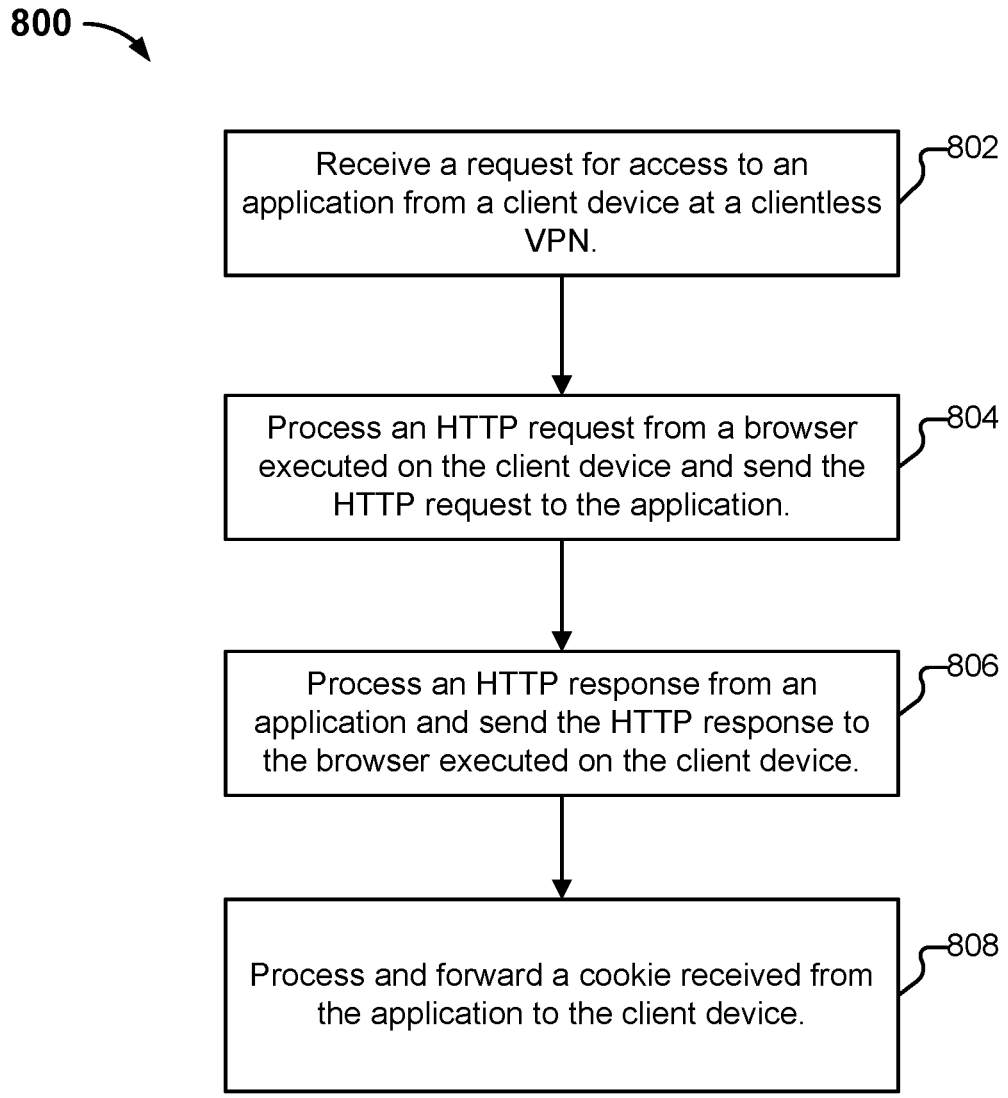
FIG. 8 is another flow diagram of a process for an advanced clientless VPN in accordance with various embodiments.

FIG. 8 is another flow diagram of a process for an advanced clientless VPN in accordance with various embodiments. In some embodiments, a process 800 as shown in FIG. 8 is performed by the platform and techniques as similarly described above including the embodiments described above with respect to FIGS. 3A 3B and 4 (e.g., is performed by an advanced clientless VPN as described above with respect to FIGS. 3A 3B and 4).

The process begins at 802 when a request for access to an application from a client device is received at a clientless VPN. For example, a user can log in to a firewall (e.g., that includes the clientless VPN) to initiate access to the application (e.g., an external web site) as similarly described above with respect to FIGS. 3A 3B and 4.

At 804, processing an HTTP request from a browser executed on the client device and sending the HTTP request to the application is performed. For example, the HTTP request can be processed as similarly described above with respect to FIGS. 3A 3B and 4.

At 806, processing an HTTP response from the application and sending the HTTP response to a browser executed on the client device is performed. For example, the HTTP response can be processed as similarly described above with respect to FIGS. 3A 3B and 4.

At 808, processing and forwarding a cookie received from the application to a browser executed on the client device is performed. For example, the cookie can be processed as similarly described above with respect to FIGS. 3A 3B and 4.

D. Handling JavaScript

In order to provide a good user experience (e.g., in an environment incorporating data appliance 302), not only should a user be able to visit a remote site (e.g., cnn.com), but also links made available on that site (e.g., to various articles, other websites, etc.). Accordingly, in various embodiments (and, e.g., incorporating techniques described above), data appliance 302 rewrites URIs of links appearing within pages requested by clients (e.g., client device 304).

FIG. 9A illustrates an example of HTML that can be received by data appliance 302 for processing (e.g., at the request of client device 304). In the example shown, an end user is requesting a page associated with a gambling website. Included in the HTML are various links, including to a style sheet (902), and various JavaScript (904-906). Also included in page 900 is JavaScript code 908.

FIG. 9B illustrates an example of page 900 after processing by an embodiment of data appliance 302. Suppose the IP address of the data appliance is 192.1.2.3 and that the URL of the gambling website is www.onlinepokerplay.com. Link 902 is rewritten as link 952 (e.g., in accordance with techniques described above, via regular expressions, or any other appropriate technique). Links 904 and 906 are similarly rewritten by data appliance 302 as links 954 and 956, respectively.

In some embodiments, script 908 is similarly transformed by data appliance 302. However, doing so may require more time/computing resources than would otherwise be available to data appliance 302 (and/or could otherwise cause data appliance 302's performance to diminish below an acceptable level). For example (and as described in more detail below), escaping single/double quotes and line breaks in JavaScript code of pages that pass through data appliance 302 can require significant computing resources on the part of data appliance 302 (e.g., as data appliance 302 needs to interpret the packets looking for such bytes and convert them). Accordingly, in other embodiments, JavaScript appearing within a page (i.e., not linked to as with links 904 and 906) is instead marked for processing by the end user's client (e.g., processing by panportal.js, which incorporates Esprima). An example of such marking by data appliance 302 is depicted in region 958. In particular, the JavaScript code is enclosed within a function (pan_eval) which is defined in panportal.js, and will be executed by panportal.js on the end user's client. The pan_eval( ) function wraps the native JavaScript eval( ) function, and is a function that evaluates JavaScript code represented as a string, in particular, to rewrite any URIs made use of by the JavaScript.

In order to pass pan_eval( ) a string, in addition to inserting the pan_eval function itself, data appliance 302 also adds quotes (960, 962) and escapes newlines (964-974) and special characters such as single quotes (e.g., 976) and double quotes (e.g., 978) in the JavaScript code so that the code can be passed to pan_eval as a single string argument. The pan_eval function can then parse the string and convert/rewrite any URIs included in the string.

Example page 900 is a relatively simple web page, written entirely in ASCII. However, web content can be authored in many different languages, and make use of a variety of types of Unicode encoding. Further, a given web page may include content authored in multiple languages, having different encodings. For example, Unicode can be implemented using a variety of character encodings, such as UTF-8, UTF-16, and UTF-32. In UTF-8, one byte is used for the first 128 code points, and up to an additional four bytes are available for use by other characters. UTF-8 is backwards compatible with ASCII, as the first 128 characters of UTF-8 correspond, respectively with ASCII characters, using a single octet with the same respective binary value. Accordingly, valid ASCII text is valid UTF-8 encoded Unicode as well.

Suppose a web page includes content authored in Unicode with UTF-16 encoding and that included in the page is JavaScript code that launches a popup box that includes a message that uses Chinese characters. An example of a Chinese word is "层层" which can be represented in binary as "01000010 01011100 01000010 01011100" in UTF-16 encoding (and, for brevity, will be hereinafter be denoted using hexadecimal: as "\x42\x5c\x42\x5c"). Unfortunately, a problem can arise in embodiments of data appliance 302 when characters such as 层层 are received. First, in various embodiments, data appliance 302 may not know whether a given byte corresponds to which code page/language (without undertaking potentially resource intensive processing). If data appliance 302 escapes characters by searching for known special symbols (e.g., "\" represented in binary as "1011100" and in hexadecimal as "\x5c") and adding an escape character (e.g., "\"), data appliance 302 might therefore erroneously rewrite "\x42\x5c\x42\x5c(层层)" as "\x42\x5c\x5c\x42\x5c\x5c(层籀雁)," which will not be renderable in the end user's browser, as "层籀雁" is not a meaningful word in Chinese. As an alternate example, suppose data appliance 302 receives a page that includes the word 谢谢 represented as a two 8-bit byte code point in Unicode with UTF-16 encoding as "\x22\x8c\x22\x8c." Embodiments of data appliance 302 might erroneously rewrite "\x22\x8c\x22\x8c" as "\x5c\x22\x8c\x5c\x22\x8c," inserting the character for "\" into the bytes that form the codepoint "\x22\x8c." JavaScript syntax requires that a string start with either a double quote or a single quote, and similarly end with a respective double quote or single quote (forming a pair). In this scenario, in addition to erroneously transforming the word 谢谢 (\x22\x8c\x22\x8c) into unknown words "슬감쇄" ("\x5c\x22\x8c\x5c\x22\x8c"), this also breaks Unicode encoding which uses 2-byte alignment. The "\x22" could be treated by data appliance 302 as a double quote, potentially indicating the end of the string. Any additional characters appearing after the \x22 will be ignored/excluded and conversion/parsing of the string (e.g., by panportal.js) will fail. A third example of a potentially problematic special character is the single quote ("\x27") which can similarly appear as a single byte or as a component of a multi-byte character.

The approach taken in the example of FIG. 9B potentially requires an understanding (e.g., by data appliance 302) of the encoding type of the input, and potentially requires the parsing of the original input which can increase the load on data appliance 302. And, by adding escape characters, the original input (i.e., the web content provided to data appliance 302) is changed in a way that could potentially bring unexpected results (e.g., when executed by a client device). In various embodiments, data appliance 302 uses an alternate approach to handling code such as is depicted in region 908 of FIG. 9A and mitigates the aforementioned problems. In the alternate approach, data appliance 302 does not need to know the encoding type. In particular, in various embodiments, data appliance 302 is configured to insert a wrapper function (973 as depicted in FIG. 9C) around the contents of JavaScript code. When the page (including the wrapped code) is passed to the client browser, the browser will execute the function, and transform the code contained within the function into a string, which can then be used as input to the pan_eval( )(or other appropriate function) for analysis (as a string). In the example shown, the values indicated in region 975 define an offset for the string.

FIG. 9D illustrates an example of an excerpt of more complicated JavaScript code to which data appliance 302 has applied a wrapper (e.g., starting at 982 and ending at 984). As illustrated in FIG. 9D, this approach can handle scripts of arbitrary complexity, such as ones involving JavaScript code with different languages, different encodings, etc.

Figure 10:
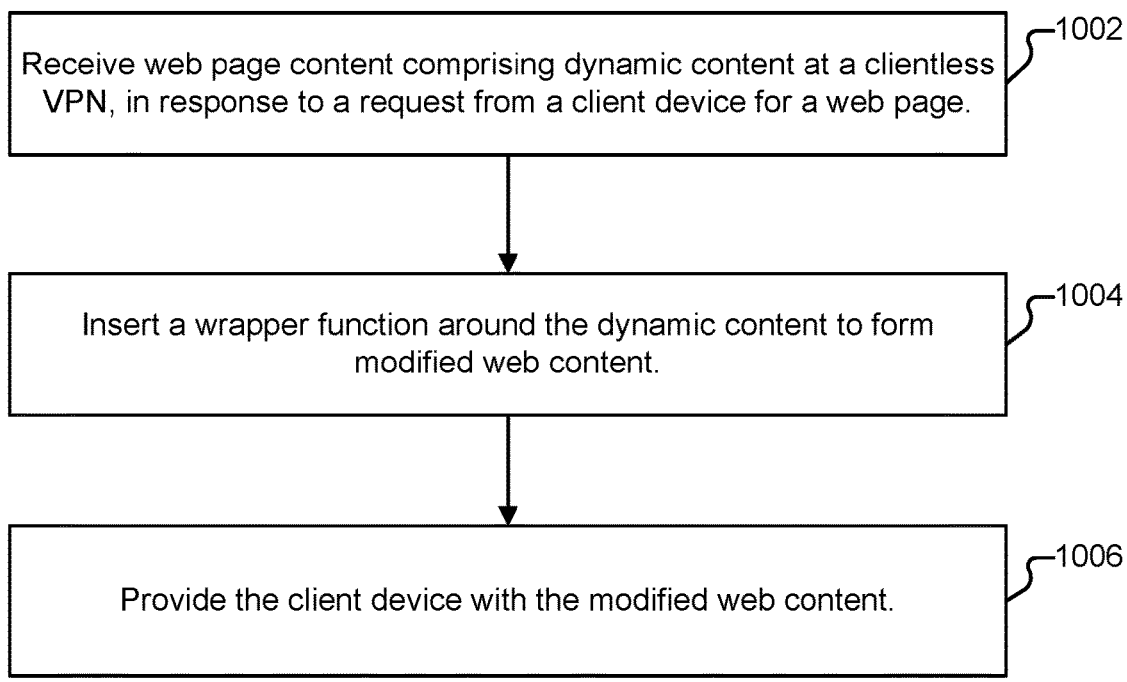
FIG. 10 illustrates an example of a process for handling, at a clientless VPN, the rewriting of dynamic content.

FIG. 10 illustrates an example of a process for handling, at a clientless VPN, the rewriting of dynamic content. In various embodiments, process 1000 is performed by data appliance 302. The process begins at 1002 when web page content comprising dynamic content is received at a clientless VPN and in response to a request from a client device for a web page. As one example of portion 1002 of process 1000, suppose client device 304 requests a page (e.g., www.cnn.com), such as by interacting with a portal provided by an embodiment of data appliance 302. When data appliance 302 receives web content from cnn.com (including dynamic content such as JavaScript), that is an example of portion 1002 of process 1000. The techniques described herein can also be used with respect to other kinds of dynamic content, instead of/in addition to JavaScript included within a web page. As one example, XML/XLST content requested by a client device can similarly be handled by data appliance 302 using process 1000. At 1004, a wrapper function is inserted around the dynamic content, modifying the received web page content. One example of such an insertion is depicted in FIG. 9C, where lines 973 and 975 are inserted by data appliance 302. Another example of such an insertion is depicted in FIG. 9D, where lines 982 and 984 are inserted by data appliance 302. In various embodiments, data appliance 302 also takes other actions, such as rewriting any static URIs present in the web content. In other embodiments, rewriting of static URIs is handled by client device 304 (i.e., by JavaScript code executing on client device 304 as served to client device 304 by data appliance 302 via a portal). Finally, at 1006, the client device is provided with the modified web content. As previously mentioned, the portal provided to client device 304 incorporates JavaScript that helps support clientless VPN functionality, including by evaluating identified JavaScript strings (i.e., as identified/marked by data appliance 302 in accordance with techniques described herein) and rewriting any URIs contained within such JavaScript.

E. Web Storage

Prior to adoption of HTML5, web application data was typically stored in an end user's browser (e.g., by a domain such as www.example.com) using cookies. With HTML5, data can also be stored/retrieved/managed using web storage via a standardized set of function calls as follows. The setItem( ) method takes as input a key name and value, and either adds the key/value pair to the storage, or (if already present in the storage) updates the value. The getItem( ) method takes as input a key name and returns that key's value, or null (if the key does not exist). The removeItem( ) method takes as input a key name and will remove that key from storage. The key( ) method takes as input an integer (e.g., "3") and returns the name of the corresponding key in storage (e.g., the fourth key, as the index starts with 0). The clear( ) method removes all stored keys. In addition to five web storage methods, a property also exists ("length"), which returns an integer that represents the number of data items stored in the storage. Further, a storage event exists, and is fired when a storage area (localStorage or sessionStorage) is modified.

Web storage can be used in one of two ways: local storage (window.localStorage), which stores data with no expiration date, and session storage (window.sessionStorage) which persists until a browser tab is closed. Web storage is key-value based, and is compartmentalized per domain. Thus, a first website (e.g., www.amazon.com) and a second website (e.g., www.cnn.com) could each include code (e.g., served to a client browser) setting a username by including a line such as the following in a web page served to an end user's client:

localStorage.setItem('username', 'jsmith');

Since the storage area for web storage is reserved per domain, two different domains can use the same key (e.g., "username") and have the same, or different values (e.g., "jsmith" or "janesmith") without impacting the keys/values of other domains.

As explained above, in various embodiments, data appliance 302 rewrites URIs (e.g., in accordance with techniques described herein), such as from http://www.cnn.com to http://192.1.2.3/www.cnn.com and from http://www.amazon.com to http://192.1.2.3/www.amazon.com. A conventional browser (e.g., implementing HTML5 standards) will consider the "domain" for both of these rewritten URIs to be 192.1.2.3 (or whatever the applicable domain of the clientless VPN is). Unfortunately, this can result in a collision between the local storage used by www.cnn.com and www.amazon.com (as keys/values will both wind up in a storage area for the domain 192.1.2.3). Such collisions can present functionality problems (e.g., a user may not be able to log in), efficiency problems (e.g., instead of storing certain information locally, it will have to be provided by the site to the browser each time), and also security problems (e.g., where information stored for a first site may be exposed when the user interacts with a second site). As will be described in more detail below, in various embodiments, data appliance 302 is configured to wrap (or otherwise extend/replace/augment) the native web storage functionality provided by an end user's browser, thus allowing for support of rewritten URIs and also per-domain web storage. In particular, in various embodiments, JavaScript served by portal 350 includes code which supports a web storage layer that works on top of the native web storage provided by the browser. Such an approach does not require a given site (e.g., www.cnn.com or www.amazon.com) to alter the content that it sends to the client browser (i.e., is transparent to the website making use of web storage). Such an approach also does not require alteration of the browser itself (e.g., alteration of Chrome or Firefox). In particular, and as will be described in more detail below, the JavaScript served by portal 350 generates and makes use of a unique identifier for each domain, and wraps/extends native web storage function calls.

Figure 11:
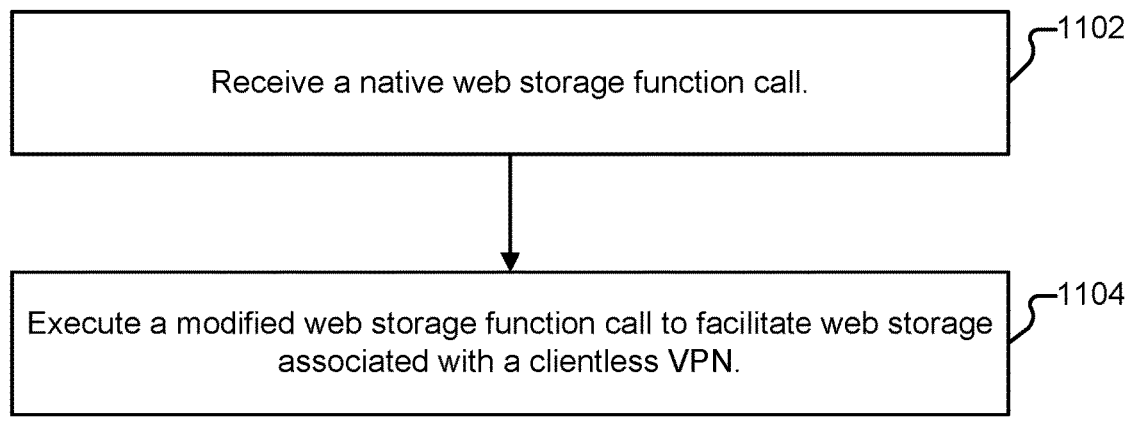
FIG. 11 illustrates an example of a process for handling web storage interactions for a clientless VPN environment.

FIG. 11 illustrates an example of a process for handling web storage interactions for a clientless VPN environment. In various embodiments, process 1100 is performed within a browser executing on a client device. As previously mentioned, in various embodiments, a visitor to portal 350 can be served JavaScript code (e.g., as panportal.js) which helps support clientless VPN functionality, including by augmenting/superseding various native functionality of a visiting end user's browser.

Process 1100 begins at 1102 when a native web storage function call is received. One example of processing performed at 1102 occurs when a client (e.g., client device 304) requests (e.g., via portal 350) web content that includes a function call requesting an interaction with a browser's web storage. Suppose a shopping website, such as one available at www.amazon.com, uses a browser's web storage to save/load an end user's shopping cart. Every time the user adds an item to the shopping cart (e.g., by interacting with the page), the item is also automatically added to the user's web storage. An example of such a function call for saving an item to a web storage is as follows:
window.local Storage.setItem("shopping_cart", JSON.stringify([{id: 1, name: "Book 1" }]))

Whenever the user next visits the shopping site, the shopping cart can be accordingly loaded from the browser's web storage, such as through the following function call:
var shopping_cart=JSON.parse(window.localStorage.getItem("shopping_cart"))

An example of portion 1102 of process 1100 occurs when the client browser receives the shopping page that includes such line(s).

At 1104, a modified web storage function call is executed. In particular (and as will be described in more detail below), panportal.js includes versions of web storage function calls which extend the functionality of the native web storage function calls (and also make use of the native web storage function calls). An example of code that can be included in panportal.js in various embodiments is depicted, collectively, in FIGS. 12A-12C.

As indicated in region 1202, native web storage calls (e.g., for interaction with native localStorage) are hooked. Attempts by a page (e.g., as served by www.cnn.com or www.amazon.com through portal 350) will be intercepted, such that calls such as the following will interact with the clientless-VPN aware versions of the functions, instead of the native ones:

```
window.localStorage.getItem("aaa");
window.localStorage.setItem("aaa", "bbb");
window.localStorage.key(0);
```

```
window.localStorage.removeItem("aaa");
window.localStorage.clear( );
window.localStorage.length;
```

Region 1204 depicts code for an augmented setItem( ) call. Region 1206 depicts code for an augmented getItem( ) call. Region 1208 depicts code for an augmented removeItem( ) call. Region 1210 depicts code for an augmented key( ) call. Region 1212 depicts code for an augmented clear( ) call. Region 1214 depicts code for an augmented way of getting the "length" property.

Using the augmented setItem( ) call as an example, region 1216 depicts code for obtaining (by the panportal.js JavaScript code) which website the end user is currently visiting in an open browser tab (e.g., www.amazon.com). The code in region 1216 then determines whether a unique identifier for the domain has already been assigned, and if not, assigns one. In the example shown in region 1216, each unique domain is assigned a unique integer (starting with "0"). That assigned integer will be combined with all keys used by that domain. As one example, suppose www.amazon.com and www.cnn.com both wish to store values for "username." The enhanced setItem( ) call depicted in region 1204 would store such values using a key of 0_username and 1_username (instead of a key of username for both, which would lead to a collision as explained above). Other approaches can also be used to generate unique identifiers for domains, such as by prepending the name of the domain itself (e.g., www.amazon.com_username and www.cnn.com_username), as applicable.

In region 1220, the enhanced setItem( ) call makes a call to the native storage, using the aforementioned format (e.g., 0_username) and storing a value. In addition, a determination is made as to whether a key (e.g., username) already exists for a given domain. If not, at 1218 the key's identifier is included in a list of keys used by each given domain (e.g., "www.amazon.com": {id:0, keys: {username, font_size}}). The array of keys is used by the enhanced key( ) call so that only those keys associated with a given domain (e.g., www.amazon.com, also known by its identifier 0) are returned (e.g., 0_username and 0_font_size) rather than all keys stored in the web storage (e.g., 0_username, 1_username, 0_font_size, etc.). Other web storage function calls are similarly wrapped/enhanced to work with unique domains as shown in the remainder of FIGS. 12A-12C. For example, the enhanced removeItem( ) call removes the key (e.g., 0_username) from both the local storage, and also from the list of keys associated with the implicated domain (e.g., removing "username" from "www.amazon.com": {id: 0, keys: {username, font_size}}). Further, while the provided examples generally describe use of function calls related to localStorage in a clientless VPN, the same approach can also be used with respect to other web storage function calls, such as sessionStorage function calls, and the storage event.

F. Object Property Getter and Setter (Accessor Function Calls) and Object Method Function FIG. 13 illustrates an example of a snippet of JavaScript code. Snippet 1300 is an example of code that could be included in a website (e.g., a shopping website such as is available at www.amazon.com) to detect whether the code is being executed in a whitelisted iframe domain (e.g., one operated by Amazon.com, Inc.). If the code is instead determined to be embedded in an unauthorized domain's web page, the JavaScript code provides an error (1302).

As explained above, in various embodiments, data appliance 302 rewrites URIs (e.g., in accordance with techniques described herein), such as from http://www.cnn.com to http://192.1.2.3/www.cnn.com and from http://www.amazon.com to http://192.1.2.3/www.amazon.com. Also as previously explained, a conventional browser will consider the "domain" (1304) for both of these rewritten URIs to be 192.1.2.3 (or whatever the applicable domain of the clientless VPN is). Unfortunately, this can result in a website, such as one incorporating snippet 1300, to malfunction (e.g., providing an end user with alert 1302 instead of otherwise rendering the page when it is served via portal 350).

Rather than providing a static list of whitelisted domains (e.g., "www.amazon.com" and "smile.amazon.com"), snippet 1300 obfuscates the whitelisted domains, posing a potential challenge for data appliance 302 and client device 304 to identify and accurately rewrite any such whitelisted domains (e.g., to 192.1.2.3). In particular, data appliance 302 may be unable to determine that "a" is "window.top.document" or that "b" is the domain (set using a setter function), prior to its evaluation (via a getter function). And, as a result, a[b] will return the portal domain (e.g., 192.1.2.3) instead of "www.amazon.com." In order to return the correct content to the browser, at best, additional time/computing resources may be required. And, in many cases, data appliance 302 will be unable to determine what "a[b]" means, breaking functionality of the page.

In various embodiments, data appliance 302 is configured to wrap (or otherwise extend/replace/augment) native accessor functions (e.g., getter and setter functions), thus allowing code such as is shown in FIG. 13 to execute transparently of the clientless VPN environment. As one example, the setter will be called each time a set occurs, and a callback can be performed to determine which value(s) have been set. As applicable, those values can be modified (e.g., by URI rewriting) so that dynamically referenced resources can be obtained via the clientless VPN (in accordance with techniques described above). For example, the modified setter can take as input the input originally destined for the native setter, evaluate it (e.g., using URI rewriting or other functionality provided by panportal.js), and then provide the rewritten URI to the native setter.

Similarly, the getter is modified such that values reported back to website's code (e.g., about the location of a resource, such as an image) are transformed from pointing at data appliance 302 back to the original domain (e.g., www.amazon.com) and thus appear to a website to be unmanipulated. As one example, the modified getter reports "www.amazon.com/location_of_img.jpg" as a source for a resource instead of "192.1.2.3/www.amazon.com/location_of_img.jpg" to a script provided by a website, while the resource is actually obtained from "192.1.2.3/www.amazon.com/location_of_img.jpg" when rendering the page. Such a modification to the getter function can be helpful in combating malicious JavaScript code which checks to see if it is running in an environment in which URIs are rewritten by making use of the getter functionality.

The approaches described herein for handling accessor function calls do not require a given site (e.g., www.cnn.com or www.amazon.com) to alter the content that it sends to the client browser (such as snippet 1300) to function properly (i.e., is transparent to the website) in a clientless VPN environment. Such an approach also does not require alteration of the browser itself (e.g., alteration of Chrome or Firefox). And, such an approach (and in particular, the functionality provided by the modified getter) helps malicious code be tricked into believing that it is executing outside of a clientless VPN.

Figure 14:
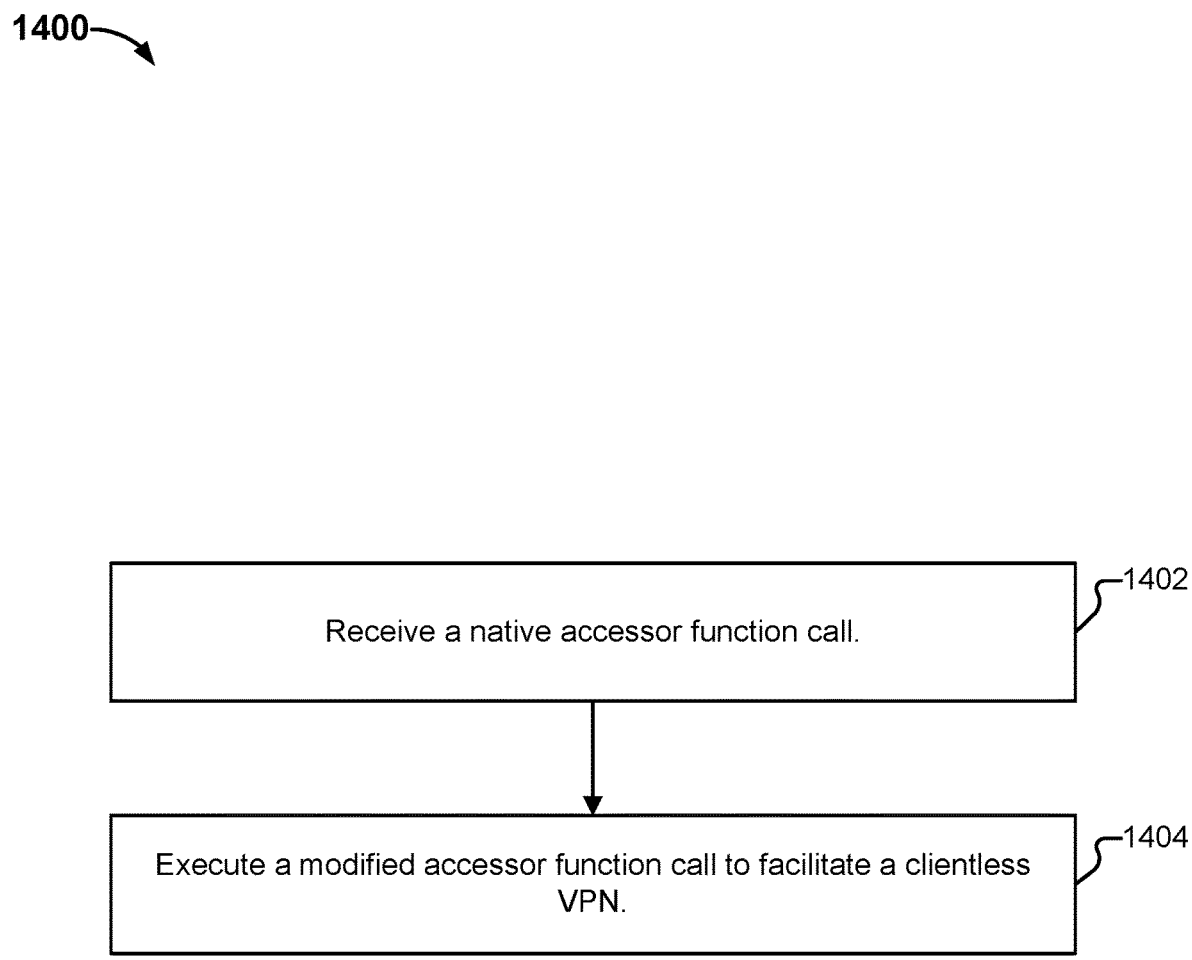
FIG. 14 illustrates an example of a process for handling obfuscated code in a clientless VPN environment.

FIG. 14 illustrates an example of a process for handling obfuscated code in a clientless VPN environment. In various embodiments, process 1400 is performed within a browser executing on a client device. As previously mentioned, in various embodiments, a visitor to portal 350 can be served JavaScript code (e.g., as panportal.js) which helps support clientless VPN functionality, including by augmenting/superseding various native functionality of a visiting end user's browser.

Process 1400 begins at 1402 when a native accessor function call is received. One example of processing performed at 1402 occurs when a client (e.g., client device 304) requests (e.g., via portal 350) web content that includes a function call associated with an accessor function call (e.g., a setter or getter function call). As one example, portion 1402 of process 1400 occurs when a client device receives snippet 1300.

At 1404, a modified accessor function call is executed. Examples of modified setter and getter functions are depicted in FIGS. 17A and 17B. In various embodiments, JavaScript's Object.defineProperty) is used to hook native browser code, and swap out the browser's native functions. Pseudocode excerpts of examples of replacement functions are shown in FIG. 15. In particular, the native setter/getter functions are preserved, as they will ultimately be called by the modified versions (e.g., as specified in panportal.js).

FIG. 16 depicts an example of a way to hook the "src" attribute of an HTML image object in accordance with the techniques described herein. Similar approaches can be used to hook other attributes, as applicable. Suppose a website (e.g., accessible via portal 350) includes the following line of HTML regarding its logo:

<img id="main_logo" src="/img/main_logo.jpg"/>

Further suppose that the following line is also included (e.g., in JavaScript) in the website page:

var logo=document.getElementByld("main-logo");

With the aforementioned hooks (e.g., as depicted in FIGS. 15 and 16) in place, the following line will trigger the modified "set" function to be called:

logo.src="/img/new main_logo.jpg";

and the following line will trigger the modified "get" function to be called:

var new_url=logo.src.

The techniques described herein can also be used in conjunction with modifying object method function calls.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a client device, content obtained from a remote server by a clientless VPN, wherein the content obtained from the remote server includes a script, and wherein a URI associated with the content obtained from the remote server is modified by the clientless VPN prior to transmitting the content to the client device;
execute, by a browser, at the client device, at least a portion of the content, including the script; and preserve functionality provided by the script at least in part by, in response to determining that a native getter function call has been made by the script at the browser, execute a modified getter function call at the browser, wherein the modified getter function call executed at the browser replaces the modified URI with an unmodified URI; and a memory coupled to the processor and configured to provide the processor with instructions.

2. The system of claim 1 wherein the processor is further configured to execute a modified native setter function call.

3. The system of claim 2 wherein the modified native setter function call provides a callback that indicates a value that would be set by the native setter function call in the event the native setter function call was not modified.

4. The system of claim 1 wherein the processor is further configured to execute a modified native object method function call.

5. The system of claim 1 wherein executing the modified getter function call includes providing a modified input to the native getter function call, wherein the modified input is different from an original input to the native getter function call.

6. The system recited in claim 1, wherein the modified getter function call is included in code provided to the system by a portal hosted by a clientless VPN.

7. A method, comprising:
receiving, at a client device, content obtained from a remote server by a clientless VPN, wherein the content obtained from the remote server includes a script, and wherein a URI associated with the content obtained from the remote server is modified by the clientless VPN prior to transmitting the content to the client device;
executing, by a browser, at the client device, at least a portion of the content, including the script; and
preserving functionality provided by the script at least in part by, in response to determining that a native getter function call has been made by the script at the browser, executing a modified getter function call at the browser, wherein the modified getter function call executed at the browser replaces the modified URI with an unmodified URI.

8. The method of claim 7 further comprising executing a modified native setter function call.

9. The method of claim 8 wherein the modified native setter function call provides a callback that indicates a value that would be set by the native setter function call in the event the native setter function call was not modified.

10. The method of claim 7 wherein executing the modified getter function call includes providing a modified input to the native getter function call, wherein the modified input is different from an original input to the native getter function call.

11. The method recited in claim 7, wherein the modified getter function call is included in code provided to a system by a portal hosted by a clientless VPN.

12. A computer program product embodied in a tangible computer readable storage medium and comprising computer instructions for:
receiving, at a client device, content obtained from a remote server by a clientless VPN, wherein the content obtained from the remote server includes a script, and wherein a URI associated with the content obtained from the remote server is modified by the clientless VPN prior to transmitting the content to the client device;
executing, by a browser, at the client device, at least a portion of the content, including the script; and
preserving functionality provided by the script at least in part by, in response to determining that a native getter function call has been made by the script at the browser, executing a modified getter function call at the browser, wherein the modified getter function call executed at the browser replaces the modified URI with an unmodified URI.

13. The computer program product recited in claim 12, wherein the computer program product further comprises computer instructions for executing a modified native setter function call.

14. The computer program product recited in claim 13 wherein the modified native setter function call provides a callback that indicates a value that would be set by the native setter function call in the event the native setter function call was not modified.

15. The computer program product recited in claim 12 wherein executing the modified getter function call includes providing a modified input to the native getter function call, wherein the modified input is different from an original input to the native getter function call.

16. The computer program product recited in claim 12, wherein the modified getter function call is included in code provided to a system by a portal hosted by a clientless VPN.

17. The method of claim 7 further comprising executing a modified native object method function call.

18. The computer program product recited in claim 12, wherein the computer program product further comprises computer instructions for executing a modified native object method function call.

* * * * *